US012705245B2

(12) United States Patent
Heritier et al.

(10) Patent No.: US 12,705,245 B2
(45) Date of Patent: Aug. 11, 2026

(54) SYSTEM AND METHOD FOR RECORD IDENTIFICATION

(71) Applicant: GENETEC INC., Saint-Laurent (CA)

(72) Inventors: Maguelonne Heritier, Pierrefonds (CA); Mozhday Shahbazi, Sherbrooke (CA); Maryam Shahbazi, Candiac (CA); François Seguin, Longueuil (CA)

(73) Assignee: GENETEC INC., Saint-Laurent (CA)

( * ) Notice: Subject to any disclaimer, the term of this patent is extended or adjusted under 35 U.S.C. 154(b) by 158 days.

(21) Appl. No.: 18/649,082

(22) Filed: Apr. 29, 2024

(65) Prior Publication Data

US 2024/0296164 A1 Sep. 5, 2024

Related U.S. Application Data

(63) Continuation of application No. 17/976,923, filed on Oct. 31, 2022, now Pat. No. 12,174,842.

(51) Int. Cl.
*G06F 16/00* (2019.01)
*G06F 3/04817* (2022.01)
(Continued)

(52) U.S. Cl.
CPC .... *G06F 16/24578* (2019.01); *G06F 3/04817* (2013.01); *G06F 16/285* (2019.01); *G06F 16/787* (2019.01)

(58) Field of Classification Search
CPC ........... G06F 16/24578; G06F 3/04817; G06F 16/285; G06F 16/787; G06F 18/24133; G06V 20/52
See application file for complete search history.

(56) References Cited

U.S. PATENT DOCUMENTS

| | | |
|---|---|---|
| 6,043,813 A | 3/2000 | Stickney et al. |
| 7,379,879 B1 | 5/2008 | Sloo |

(Continued)

FOREIGN PATENT DOCUMENTS

| | | |
|---|---|---|
| CN | 102789482 | 11/2012 |
| DE | 102013007248 | 10/2014 |
| EP | 3754548 | 12/2020 |

OTHER PUBLICATIONS

Amirian Soheyla et al: "Automatic Image and Video Caption Generation With Deep Learning: A Concise Review and Algorithmic Overlap", IEEE Access, IEEE, USA, vol. 8, Dec. 4, 2020 (Dec. 4, 2020), pp. 218386-218400, XP011825561, DOI: 10.1109/ACCESS.2020.3042484 [retrieved on Dec. 11, 2020].

*Primary Examiner* — Paul Kim
(74) *Attorney, Agent, or Firm* — NORTON ROSE FULBRIGHT CANADA LLP

(57) ABSTRACT

A record identification method comprises, at a computing device having a machine learning model operating therein, obtaining event occurrence record(s) indicative of occurrence of at least one event, each of the event occurrence record(s) having a first plurality of attributes associated therewith, executing the machine learning model to determine a probability distribution of the first plurality of attributes, receiving witness statement(s) relating to an incident, each of the witness statement(s) having a respective second plurality of attributes associated therewith, comparing the probability distribution of the first plurality of attributes to a probability distribution of the respective second plurality of attributes, identifying, based on the comparing, at least one of the event occurrence record(s) for which the probability distribution of the first plurality of attributes matches the probability distribution of the respective second plurality of attributes, and outputting the at least one of the event occurrence record(s).

28 Claims, 15 Drawing Sheets

(51) Int. Cl.

| | |
|---|---|
| ***G06F 16/2457*** | (2019.01) |
| ***G06F 16/28*** | (2019.01) |
| ***G06F 16/787*** | (2019.01) |

(56) References Cited

U.S. PATENT DOCUMENTS

| | | | | |
|---|---|---|---|---|
| 8,068,016 | B2 | 11/2011 | Toh | |
| 8,069,062 | B2 | 11/2011 | Wahlbin et al. | |
| 8,521,763 | B1 | 8/2013 | Haeg et al. | |
| 8,738,365 | B2 | 5/2014 | Ferrucci et al. | |
| 9,753,986 | B2 | 9/2017 | Dubbels et al. | |
| 11,062,224 | B2 | 7/2021 | Chen et al. | |
| 11,244,113 | B2 | 2/2022 | Adderly | |
| 2002/0059083 | A1* | 5/2002 | Wahlbin | G06Q 10/10 705/4 |
| 2005/0144156 | A1 | 6/2005 | Barber | |
| 2012/0030208 | A1 | 2/2012 | Brown et al. | |
| 2014/0087356 | A1 | 3/2014 | Fudemberg | |
| 2016/0147875 | A1* | 5/2016 | Adderly | G06F 40/30 707/726 |
| 2016/0148093 | A1 | 5/2016 | Adderly et al. | |
| 2018/0129742 | A1 | 5/2018 | Li et al. | |
| 2019/0370562 | A1 | 12/2019 | Yigit et al. | |
| 2020/0334772 | A1* | 10/2020 | Gorodeisky | G06F 40/289 |
| 2022/0067076 | A1 | 3/2022 | Ghosh et al. | |
| 2023/0094389 | A1* | 3/2023 | You | G06N 5/01 706/62 |
| 2025/0131694 | A1* | 4/2025 | Iscen | G06V 10/761 |

* cited by examiner

500

502

RECEIVING WITNESS STATEMENT(S) RELATING TO AN INCIDENT, EACH WITNESS STATEMENT HAVING ATTRIBUTES, EACH ATTRIBUTE HAVING A CONFIDENCE VALUE ASSOCIATED THEREWITH

504

QUERYING, USING THE WITNESS STATEMENT(S) AND THE CONFIDENCE VALUE ASSOCIATED WITH EACH ATTRIBUTE, AT LEAST ONE DATABASE TO IDENTIFY AT LEAST ONE EVENT OCCURRENCE RECORD THAT MATCHES THE WITNESS STATEMENT(S)

506

OUTPUTTING THE AT LEAST ONE EVENT OCCURRENCE RECORD

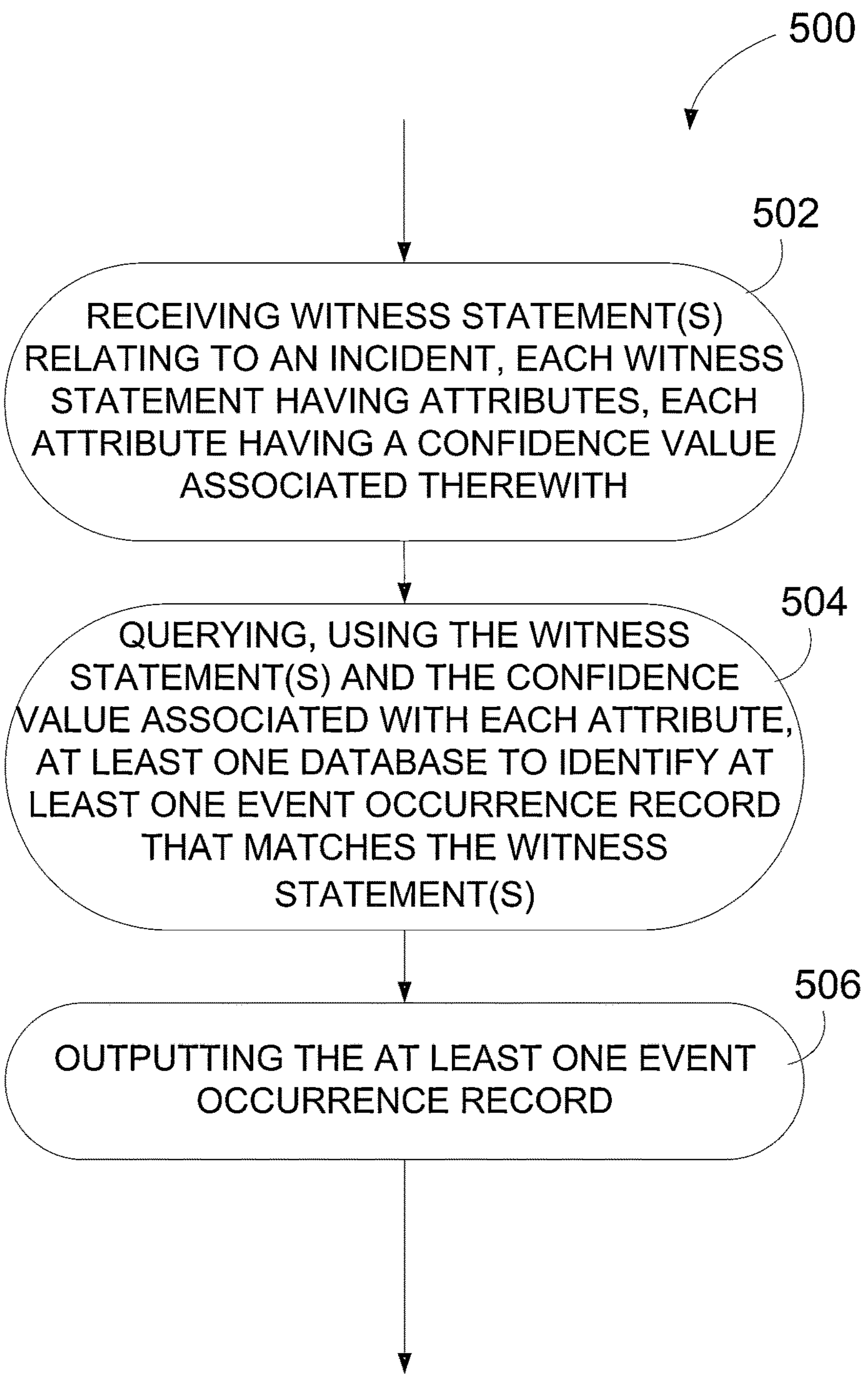

522 OBTAINING EVENT OCCURRENCE RECORD(S) INDICATIVE OF OCCURRENCE OF AT LEAST ONE EVENT, EACH EVENT OCCURRENCE RECORD HAVING A FIRST PLURALITY OF ATTRIBUTES ASSOCIATED THEREWITH

524 EXECUTING A MACHINE LEARNING MODEL TO DETERMINE A PROBABILITY DISTRIBUTION OF THE FIRST PLURALITY OF ATTRIBUTES

526 RECEIVING WITNESS STATEMENT(S) RELATING TO AN INCIDENT, EACH WITNESS STATEMENT HAVING A RESPECTIVE SECOND PLURALITY OF ATTRIBUTES ASSOCIATED THEREWITH

528 COMPARING THE PROBABILITY DISTRIBUTION OF THE FIRST PLURALITY OF ATTRIBUTES TO A PROBABILITY DISTRIBUTION OF THE RESPECTIVE SECOND PLURALITY OF ATTRIBUTES

530 IDENTIFYING AT LEAST ONE EVENT OCCURRENCE RECORD FOR WHICH THE PROBABILITY DISTRIBUTION OF THE FIRST PLURALITY OF ATTRIBUTES MATCHES THAT OF THE SECOND PLURALITY OF ATTRIBUTES

532 OUTPUTTING THE AT LEAST ONE EVENT OCCURRENCE RECORD

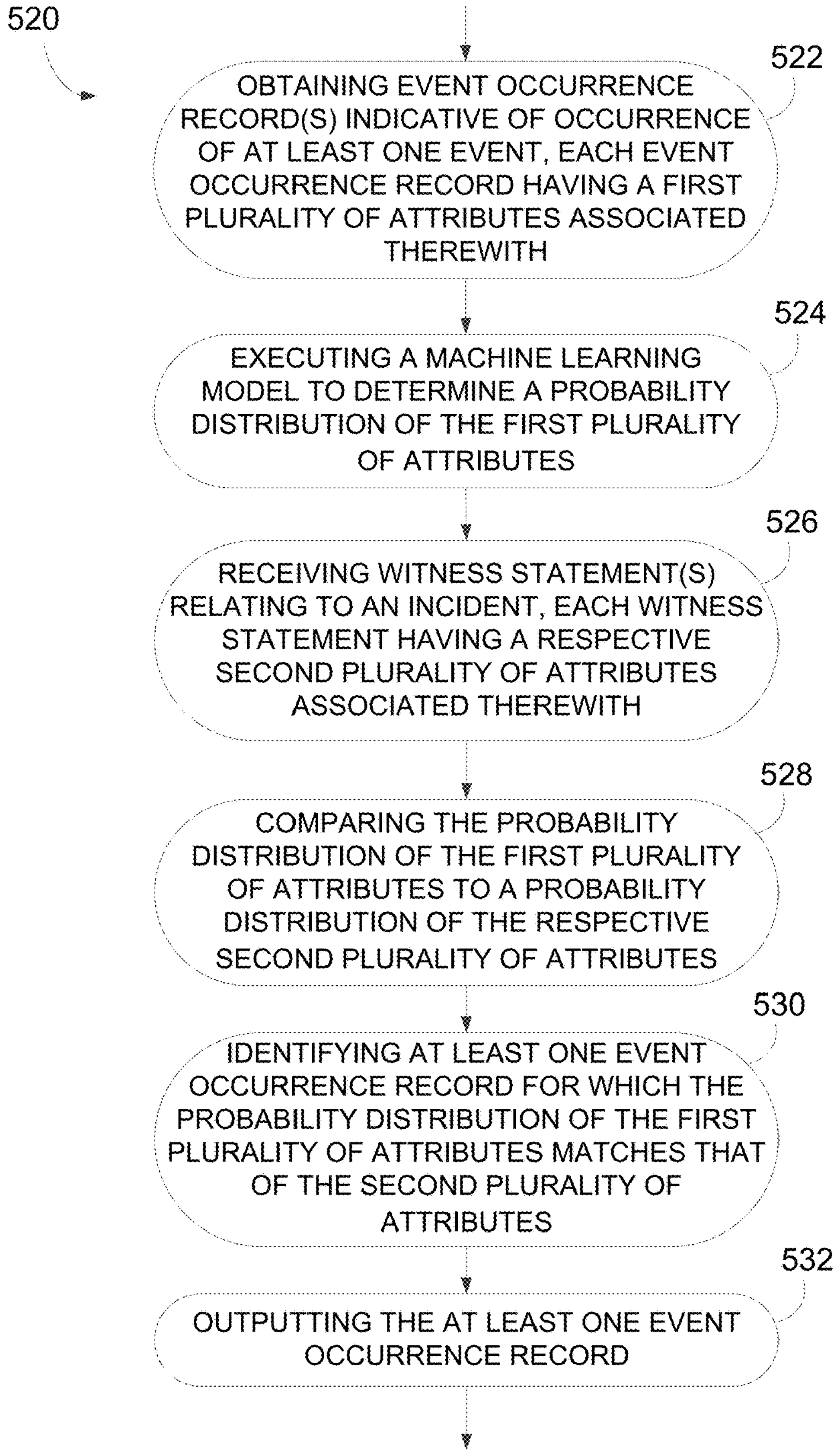

FIG. 5C

SYSTEM AND METHOD FOR RECORD IDENTIFICATION

CROSS-REFERENCE TO RELATED APPLICATIONS

This patent application is a continuation in part of U.S. application Ser. No. 17/976,923 filed Oct. 31, 2022, the entire contents of which are incorporated herein by reference.

FIELD

The improvements generally relate to the field of record identification, and more particularly to computer-implemented systems and methods for identifying records for use in investigating incidents.

BACKGROUND

When a witness of an incident provides a witness statement, they are often unable to provide certain details of the incident with confidence. In other words, witness statements are often uncompleted and contain uncertainties. For example, a witness may indicate in their statement that they saw a station wagon or a hatchback car that may be blue but cannot recall the make of the vehicle. Using conventional investigation tools, multiple queries would need to be made based on such a statement and a user would be required to sift through numerous images based on the time at which the incident was observed by the witness, the location, or some other criteria. Such a querying and review process may prove time-consuming and prone to errors. The process may become even more cumbersome when multiple witness statements are provided by different witnesses, especially if the statements contain variances or are incomplete.

There is therefore room for improvement.

SUMMARY

The present disclosure describes, among other things, an interactive investigation tool that allows one or more witnesses to provide witness statements related to one or more incidents, with a level of confidence for different statements within a given witness's statement. For example, a witness can provide attributes of a vehicle involved in the incident, such as make, model, and color, and level of confidence for each of these attributes. The tool may further be used to identify one more relevant records, such as license plate recognition (LPR) records from LPR cameras, that match the witness statements and return the results that best match the provided witness statements and associated confidence value. The systems and methods described herein may be used for monitoring and surveillance. Other embodiments may apply In accordance with one aspect, there is provided a record identification method, comprising, at a computing device having a machine learning model operating therein, obtaining one or more event occurrence records indicative of occurrence of at least one event, each of the one or more event occurrence records having a first plurality of attributes associated therewith, executing the machine learning model to determine a probability distribution of the first plurality of attributes, receiving one or more witness statements relating to an incident, each of the one or more witness statements having a respective second plurality of attributes associated therewith, comparing the probability distribution of the first plurality of attributes to a probability distribution of the respective second plurality of attributes, identifying, based on the comparing, at least one of the one or more event occurrence records for which the probability distribution of the first plurality of attributes matches the probability distribution of the respective second plurality of attributes, and outputting the at least one of the one or more event occurrence records.

In at least one embodiment in accordance with any previous/other embodiment described herein, prior to the executing, the machine learning model is trained by receiving a training dataset comprising a plurality of data samples, at least some of the plurality of data samples having a plurality of user-defined classification labels associated therewith, the plurality of user-defined classification labels comprising a set of noisy labels each indicative of a labelling discrepancy associated with at least one labelled data sample, training the machine learning model using the training dataset and obtaining, at an output of the machine learning model, a predicted probability distribution of the classification labels for the plurality of data samples, comparing the predicted probability distribution to a plurality of reference classification labels, determining, based on the comparing, a proportion of confused ones of the plurality of predicted classification labels, and re-training the machine learning model based on the proportion as determined.

In at least one embodiment in accordance with any previous/other embodiment described herein, the one or more witness statements have the respective second plurality of attributes comprising at least one of a time and a location at which the incident occurred.

In at least one embodiment in accordance with any previous/other embodiment described herein, the one or more witness statements have the respective second plurality of attributes further comprising at least one of a type of the incident, information about at least one vehicle involved in the incident, a direction of travel of the at least one vehicle, information about at least one person involved in the incident, and information about a physical environment within which the incident occurred.

In at least one embodiment in accordance with any previous/other embodiment described herein, receiving the one or more witness statements comprises receiving at least one of at least part of a license plate number, a state associated with the license plate number, a make, a type, a model, a model year, a colour, a condition, and at least one unique characteristic of at least one vehicle involved in the incident.

In at least one embodiment in accordance with any previous/other embodiment described herein, receiving the one or more witness statements comprises receiving information about at least one of physical characteristics and a physical appearance of at least one person involved in the incident.

In at least one embodiment in accordance with any previous/other embodiment described herein, obtaining the one or more event occurrence records comprises retrieving the one or more event occurrence records from at least one database.

In at least one embodiment in accordance with any previous/other embodiment described herein, the one or more event occurrence records are related to surveillance and comprise data acquired by one or more electronic devices deployed at one or more monitored locations encompassing a location at which the incident occurred.

In at least one embodiment in accordance with any previous/other embodiment described herein, each of the one or more event occurrence records has associated therewith metadata comprising at least one of an occurrence record type, a time parameter, and a geographical parameter.

In at least one embodiment in accordance with any previous/other embodiment described herein, the one or more event occurrence records comprise a plurality of images of vehicles and/or license plates captured by a plurality of cameras deployed at one or more monitored locations, each of the plurality of images having associated therewith metadata comprising at least one of a vehicle license plate number, one or more vehicle characteristics, a time at which the image was captured, a location where the image was captured, and an identifier of a given one of the plurality of cameras that captured the image.

In at least one embodiment in accordance with any previous/other embodiment described herein, the one or more event occurrence records comprise video footage captured by one or more video cameras deployed at one or more monitored locations encompassing a location at which the incident occurred.

In at least one embodiment in accordance with any previous/other embodiment described herein, the video footage has metadata associated therewith, the metadata indicative of occurrence, at the one or more monitored locations, of the at least one event recorded by the one or more video cameras.

In at least one embodiment in accordance with any previous/other embodiment described herein, the one or more event occurrence records comprise a plurality of images of registered persons of interest, each of the plurality of images having associated therewith metadata comprising an identity of a registered person of interest and a location of the registered person of interest.

In accordance with another aspect, there is provided a training method, comprising, at a computing device, receiving a training dataset comprising a plurality of data samples, at least some of the plurality of data samples having a plurality of user-defined classification labels associated therewith, the plurality of user-defined classification labels comprising a set of noisy labels each indicative of a labelling discrepancy associated with at least one labelled data sample, training a machine learning model using the training dataset and obtaining, at an output of the machine learning model, a predicted probability distribution of the user-defined classification labels for the plurality of data samples, comparing the predicted probability distribution to a reference probability distribution associated with a plurality of reference classification labels, determining, based on the comparing, a proportion of confused ones of the plurality of user-defined classification labels, and re-training the machine learning model based on the proportion as determined.

In at least one embodiment in accordance with any previous/other embodiment described herein, the plurality of user-defined classification labels further comprises a set of undefined labels each indicative of a labelling uncertainty associated with an outlier one of the plurality of data samples.

In at least one embodiment in accordance with any previous/other embodiment described herein, the method further comprises determining a classification loss indicative of an error between the plurality of reference classification labels and the plurality of user-defined labels, and adjusting one or more parameters of the machine learning model based on the classification loss.

In at least one embodiment in accordance with any previous/other embodiment described herein, the method further comprises generating a confusion matrix indicative of the proportion of confused ones of the plurality of user-defined classification labels, the confusion matrix having a plurality of rows representative of the plurality of user-defined classification labels, and a plurality of columns representative of the plurality of reference classification labels.

In at least one embodiment in accordance with any previous/other embodiment described herein, re-training the machine learning model based on the proportion as determined comprises using data from the plurality of rows of the confusion matrix as an input to the machine learning model.

In at least one embodiment in accordance with any previous/other embodiment described herein, comparing the predicted probability distribution to the reference probability distribution comprises computing a cross-entropy loss between the predicted probability distribution and the reference probability distribution.

In at least one embodiment in accordance with any previous/other embodiment described herein, the method further comprises determining a distance between the predicted probability distribution of the user-defined classification labels and a probability distribution of the confused ones of the plurality of user-defined classification labels, and the machine learning model is re-trained until the distance is below a distance threshold.

In at least one embodiment in accordance with any previous/other embodiment described herein, determining the distance comprises determining a Kullback-Leiber (KL) divergence between the predicted probability distribution of the user-defined classification labels and the probability distribution of the confused ones of the plurality of user-defined classification labels.

In at least one embodiment in accordance with any previous/other embodiment described herein, the plurality of user-defined classification labels is indicative of at least one of a make, a type, a model, a model year, a colour, a condition, and at least one unique characteristic of at least one vehicle involved in an incident.

In at least one embodiment in accordance with any previous/other embodiment described herein, the plurality of user-defined classification labels is further indicative of at least one of physical characteristics and a physical appearance of at least one person involved in an incident.

In at least one embodiment in accordance with any previous/other embodiment described herein, the plurality of data samples comprises a plurality of images and/or video footage relating to an incident.

In at least one embodiment in accordance with any previous/other embodiment described herein, the plurality of images is captured by a plurality of cameras deployed at one or more monitored locations encompassing a location of the incident.

In at least one embodiment in accordance with any previous/other embodiment described herein, the video footage is captured by one or more video cameras deployed at one or more monitored locations encompassing a location of the incident.

In at least one embodiment in accordance with any previous/other embodiment described herein, the plurality of images and/or video footage depicts vehicles and/or license plates.

In at least one embodiment in accordance with any previous/other embodiment described herein, the plurality of images and/or video footage depicts at least one registered person of interest.

Many further features and combinations thereof concerning embodiments described herein will appear to those skilled in the art following a reading of the instant disclosure.

DESCRIPTION OF THE FIGURES

In the figures,

FIG. 5A is a flowchart of an example record identification method, in accordance with an illustrative embodiment;

FIG. 5C is a flowchart of an example record identification method, in accordance with another illustrative embodiment;

It will be noticed that throughout the appended drawings, like features are identified by like reference numerals

DETAILED DESCRIPTION

Described herein are computer-implemented systems and methods for record identification. As will be described further below, the systems and methods described herein may be used to implement an interactive investigation tool that allows one or more witnesses to provide witness statements related to one or more incidents, with a level of confidence for different statements within a given witness's statement. The tool may further be used to identify one more relevant records that match the witness statements and return the results that best match the provided witness statements and associated confidence value. The systems and methods described herein may be used for a variety of applications. In one embodiment, the systems and methods described herein may be used for monitoring and surveillance. Other embodiments may apply.

Figure 1:
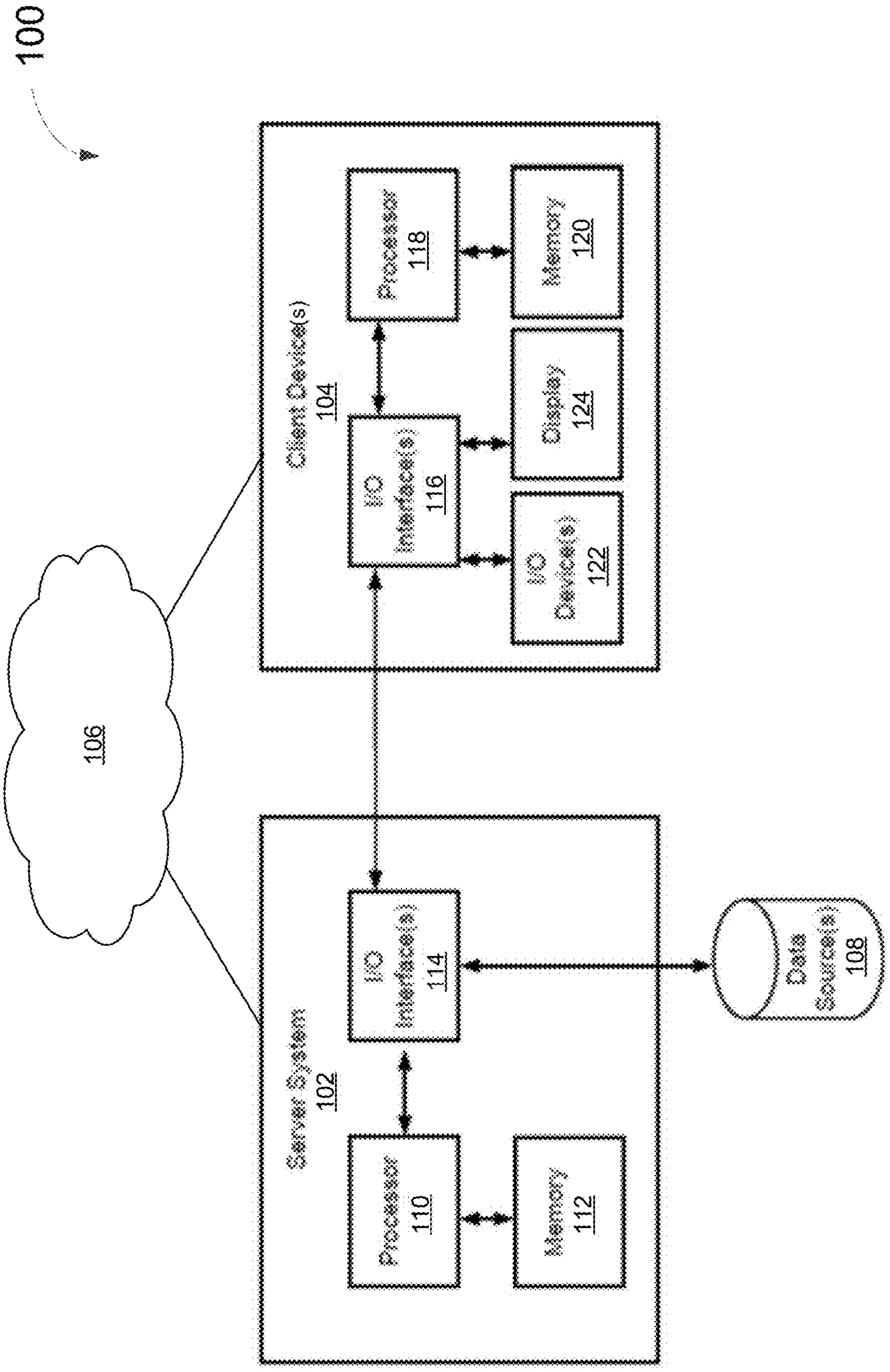
FIG. 1 is a schematic diagram illustrating a record identification system, in accordance with an illustrative embodiment.

FIG. 1 illustrates an example record identification system 100, in accordance with one embodiment. The system 100 comprises a server system 102, which may be a server-based system (as shown in FIG. 1) in communication with one or multiple client devices 104. The server system 102 and/or the client device(s) 104 may, in some embodiments, be configured to access a network 106. The network 106 may comprise any suitable network including, but not limited to, a Personal Area Network (PAN), Local Area Network (LAN), Wireless Local Area Network (WLAN), Metropolitan Area Network (MAN), or Wide Area Network (WAN), or combinations thereof. The server system 102 is also communicatively coupled to one or more data sources 108.

The server system 102 may be internal or "on-site", located in close proximity to a client device 104, for instance in the same building, or may be external or "off-site", located remotely from the client device 104, for instance in a remote data center. The server system 120 may be a cloud-based system.

The server system 102 has at least one processor 110, memory 112, and at least one input/output (I/O) interface 114 for communication with the one or more data sources 108, and/or an I/O interface 116 of the client device 104. The processor 110 may be a general-purpose programmable processor. In the example of FIG. 1, the processor 110 is shown as being unitary, but the processor 110 may also be multicore, or distributed (e.g. a multi-processor).

The computer readable memory 112 stores program instructions and data used by the processor 110. The computer readable memory 112 may also store locally event occurrence records, acting as a local database. The memory 112 may also store information regarding the data source(s) 108 that are accessible by the server system 102, such as the identity of the data sources 108, the configuration type of the data sources 108, and the like. The computer readable memory 112, though shown as unitary for simplicity in the example of FIG. 1, may comprise multiple memory modules and/or caching. In particular, the memory 112 may comprise several layers of memory such as a hard drive, external drive (e.g. SD card storage) or the like and a faster and smaller Random Access Memory (RAM) module. The RAM module may store data and/or program code currently being, recently being or soon to be processed by the processor 110 as well as cache data and/or program code from a hard drive. A hard drive may store program code and be accessed to retrieve such code for execution by the processor 110 and may be accessed by the processor 110 to store and access data. The memory 112 may have a recycling architecture where older data files are deleted when the memory 112 is full or near being full, or after the older data files have been stored in memory 112 for a certain time.

The I/O interface(s) 114 is in communication with the processor 110. The I/O interface(s) 114 may comprise a network interface and may be a wired or wireless interface for establishing a remote connection with, for example, a remote server, an external data source 108, the client device 104, etc. For instance, the I/O interface(s) 114 may be an Ethernet port, a WAN port, a TCP port, etc. The processor 110, the memory 112 and the I/O interface(s) 114 may be linked via bus connections.

The one or more data sources 108 may be one or more external database(s), one or more external systems, for example, having one or more databases, that are accessible via Application Programming Interface (API) calls, and/or one or more local databases that are part of the server system 102. A data source 108, and in particular a database, may contain one or more records related to event(s) of interest. Such records are referred to herein as "event occurrence records". The data source 108 may further contain any additional information that is relevant or related to the event occurrence records stored therein. As will be discussed further below, the server system 106 is illustratively configured to receive one or more witness statements from the client device(s) 104 and to query the data source(s) 108 to identify relevant event occurrence record(s).

In some embodiments, the data source(s) 108 (or one or more systems, not shown, that manage the data source(s) 108) may be connected to one or more electronic devices (not shown) configured to provide data to the data source(s) 108 (or system(s)), the data source(s) 108 (or system(s)) in turn creating the event occurrence records described further below. The one or more electronic devices may include, but are not limited to, surveillance cameras, license plate recognition (LPR) devices, and sensors. In some embodiments, the LPR devices may constitute the data source(s) 108. A LPR device may, for example, be a camera unit of the LPR system described in U.S. Pat. No. 11,188,776, the entire contents of which are hereby incorporated by reference, or may be any other suitable image processing device.

As used herein, the term "event" refers to an individual occurrence (e.g., an act) that took place in a certain location, at a particular time or during a particular interval of time. As used herein, the term "incident" refers to an event (e.g., crime or accident) observed by an individual, referred to herein as a "witness". As used herein, the term "witness statement" refers to an account made by a witness of facts related to an incident. The witness statement may be provided to an authorized person (e.g., to a police officer, lawyer, private investigator, or the like) in writing or orally, via filling a form or answering questions on a computer system.

As used herein, the term "occurrence record" or "event occurrence record" refers to information indicative of an event stored or provided by a data source 108 (or memory 112) and that may be accessed or obtained from the data source 108 (or memory 112). The data source 108 may be or may comprise a database that stores occurrence records. The occurrence record has metadata associated therewith, the metadata including, but not limited to, an occurrence record type, a time parameter, and a geographical parameter. In some embodiments, the occurrence record type may be omitted from the occurrence record. This may, for example, be the case when a given data source from which a given occurrence record originates is specific to only one type of occurrence records. In that case, the metadata of the given occurrence record need not include the occurrence record type and the time parameter and the geographical parameter may suffice. The occurrence record may have other metadata and data associated with additional parameters. For instance, when the occurrence record is a LPR record, the metadata associated therewith may comprise a time parameter, a geographical parameter, and a license plate number. The data structure of the occurrence record may depend upon the configuration of the data source 108 and/or database (e.g., memory 112) in which the occurrence record is stored.

As used herein, the term "time parameter" refers to a parameter specifying time, such as a timestamp, a time interval, or a period of time. Each occurrence record may have one or more time parameters associated therewith.

As used herein, the term "geographical parameter" refers to a location, such as Global Positioning System (GPS) coordinates (e.g., coordinates associated with a location at which the event occurred) or a civic address. The geographical parameter may also be a location range or an area defined by a set of coordinates. The geographical parameter may also be a straight-line distance between a location of a given camera having captured an event and the location at which the event occurred. The geographical parameter may further be a radial distance from the given camera's location to the location at which the event occurred. The distances may be specified in any suitable unit of distance such as meters, kilometers, miles, etc. In addition, the geographical parameter may comprise a direction (e.g., cardinal direction) to the location at which the event occurred. Each occurrence record may have one or more geographical parameters associated therewith.

As used herein, the term "occurrence record type" refers to the nature or type of the occurrence record. For example, the occurrence record type may be one of a surveillance video analytics event, a 911 call or computer-aided dispatch (CAD) call, the identity of a known criminal, a gunshot event, a license plate read event, etc. Data sources 108 and/or databases (e.g., memory 112) storing occurrence records may be associated with an occurrence record type.

Examples of event occurrence records thus include, but at not limited to, video footage (e.g., as captured by camera(s) deployed at one or more monitored locations), images of vehicles and/or license plate reads associated with a time parameter and/or a geographical parameter, images of at least one registered person of interest (e.g., a criminal) associated with the person's identity and/or a location parameter), mugshots, 911 call events or CAD events associated with a time parameter, a geographical parameter, a narrative and/or a priority value (e.g., 911 calls with transcripts), and gunshot events associated with the picking up of a sound that is identified to be a gunshot having a time parameter, a geographical parameter, and/or the identification of the firearm (e.g., gunshots from gunshot detectors such as ShotSpotter™). In one embodiment, the event occurrence records queried using the systems and methods described herein comprise image-based surveillance records originating form a surveillance system. For example, the event occurrence records comprise images and/or video footage captured by one or more cameras (e.g., video camera(s)) deployed at one or more monitored locations encompassing a location at which an incident under investigation occurred. The event occurrence records may also comprise LPR records that include images of license plates captured by suitable LPR device(s) deployed at the one or more monitored locations.

When the event occurrence records comprise images (e.g., of vehicles and/or of license plates), the images may have associated therewith metadata comprising, but not limited to, at least one of a vehicle license plate number, a license plate state, one or more vehicle characteristics, a time at which the image was captured, a location where the image was captured, and a device the image originated from (e.g., an identifier of a camera having captured the image). When the event occurrence records comprise video footage, such footage may have associated therewith metadata indicative of event(s) occurring in the video footage. The metadata may be obtained subsequent to processing the video footage and performing analytics thereon. The analytics may be performed either in a video surveillance camera, in a LPR camera, or any other suitable computer system. Such metadata may, for example, indicate that a vehicle of a given color is entering a parking lot at a given time. In some embodiments, an event occurrence record may be metadata in a video stream. When the event occurrence records comprise images of registered persons of interest (e.g., registered criminals), the images may have associated therewith metadata comprising, but not limited to, an identify and a location of the registered person of interest. In some embodiments, for each event occurrence record, the metadata may comprise multiple possibilities. For example, if the analytic (e.g., video surveillance camera, LPR camera, or other computer system) that provided the license plate number was unsure about the exact number, more than one license plate number may be provided in the metadata of the corresponding event occurrence record. In some embodiments, a confidence value may accompany one or more characteristics in the metadata.

As used herein, the term "attribute" refers to a feature or parameter associated with a given witness statement or event occurrence record. As will be described further below, a witness statement may comprise one or more attributes (referred to herein as "witness statement attributes"). In one embodiment, the attributes of a witness statement comprise, but are not limited to, at least one of a time parameter (i.e. a time at which an incident occurred), a location parameter (i.e. a location at which the incident occurred), a type of the incident, information about at least one vehicle involved in the incident, a direction of travel of the at least one vehicle, information about at least one person involved in the incident, and information about a physical environment within which the incident occurred. The information about the at least one vehicle involved in the incident may include, but is not limited to, at least part of a license plate number (i.e., the full license plate number or a few digits thereof), a state associated with the license plate number, a make of the vehicle, a type of the vehicle, a model of the vehicle, a model year of the vehicle, a colour of the vehicle, a condition (e.g., scratches, damage, or the like) of the vehicle, and at least one unique characteristic (e.g., accessories such as a bike rack, hitch, roof rack, spare tire, and the like) of the vehicle. The information about the at least one person involved in the incident may include, but is not limited to, physical characteristics (e.g., height, hair color, eye color, etc.) and a physical appearance (e.g., type of clothing, color of clothing, type of shoes, colors of shoes, glasses, tattoos, scars, and any other identifying mark) of the at least one person.

It should be understood that any suitable vehicle type may apply depending on the application. Examples of vehicles include, but are not limited to, cars (e.g., convertible, hatchback, sedan, wagon, coupé, Sport Utility Vehicles or SUV, . . . ), limousines, sports cars, busses, trucks, consumer trucks, semi-trucks, wagons, vans, minivans, caravans, delivery vans, dump trucks, tractors, scooters, kick scooters, bicycles, motorcycles, snowmobiles, etc. The applicable vehicles are however not limited to land vehicles. For example, railed vehicles (e.g., trains, trams, subways, etc.), watercraft (e.g., ships, boats, canoes, kayaks, yachts, etc.) and/or aircraft (e.g., airplanes, helicopters, etc.) may also apply.

An event occurrence record may also comprise one or more attributes (referred to herein as "event occurrence record attributes"). As previously noted, an event occurrence record may have an occurrence record type (indicative of the type of event), a time parameter, and a geographical parameter associated therewith. Additional attributes, such as vehicle information, environment-related information, or information about individual(s) captured in the record (e.g., at least one physical characteristic and at least one physical appearance), may also apply.

In some embodiments, all event occurrence records stored in the data source(s) 108 (or memory 112) have the same attributes. In other embodiments, the various event occurrence records stored in the data source(s) 108 (or memory 112) may have different attributes. The attributes may also be the same or different across the various witness statements. The witness statement attributes and the event occurrence record attributes may also be the same or different attributes. Some overlap between the witness statement attributes and the event occurrence record attributes is however desirable. For example, a witness statement may indicate that a witness saw a red car with a high confidence and an event occurrence record may indicate that the red car color has a confidence value of 80%, the Ford vehicle make has a confidence value of 75%, and the Mustang vehicle model has a confidence value of 60%. The overlap between the witness statement attributes and the event occurrence record attributes therefore relates to the vehicle color attribute. Furthermore, when there are multiple witnesses, the witnesses may provide witness statements having different attributes.

As used herein, the term "confidence value" refers to a value indicative of the probability (or level of certainty) that a given witness statement or attribute is correct. The confidence value may be expressed as a percentage value or in a non-mathematical form, as will be described further below.

As used herein, the term "query" refers to a request for information from a data source as in 108 and/or database (e.g., memory 112). As will be described further below, a query may use witness statement(s) and confidence value(s) associated with attribute(s) of the witness statement(s). The query may in particular include one or more time parameters and one or more geographical parameters associated with the incident, as provided in the witness statement(s). The time parameter may be a defined time or a time range (e.g., that encompasses a time at which an incident reported by a witness occurred). The geographical parameter may be a specific location (e.g. a set of coordinates), or an area (e.g. defined by a plurality of sets of coordinates), to encompass a geographical perimeter around the location at which the incident occurred. The query may specify additional parameters as a function of the event occurrence record type. For instance, when the witness statement(s) indicate that a vehicle is involved in the incident and provide a direction of travel of the vehicle, the additional parameters may include the direction of travel. In some embodiments, the data source(s) 108 (or memory 112) are queried with a time range and/or location range (or perimeter) applied to the time and/or location provided in the witness statements to identify relevant records that occur in the vicinity of the incident and around the time of the incident.

As will be described further below, the query may be performed based on comparing witness statement attributes to event occurrence record attributes and their respective confidence values to identify similarities. The comparison may be performed based on individual witness statements or witness statements as a whole. The query may then return at least one matching event occurrence record from the data source 108 (or memory 112).

In one embodiment, the query described herein may be performed using any suitable machine learning technique or model implemented by the processor 110 of the server system 102. For instance, artificial neural networks (e.g., a deep neural network) may apply, with a Bayesian model being used to compute similarity metrics, as discussed further below. The machine learning model may be trained using suitable labeled training data and a suitable optimization process to minimize a loss function. An example training method will be described further below with reference to FIG. 5D. In one embodiment, the machine learning model may be trained in advance prior to the deployment of the system 100. In other embodiments, the machine learning model may be trained in real-time, based on live data (e.g., real-time witness statements provided by a user via their client device 104). Still other embodiments may apply. For instance, a hybrid approach of training the machine learning model partly in advance and partly in real-time may be used. Furthermore, the parameters of the machine learning model may be continuously tuned to improve the model's accuracy, for example by enhancing the data fed as input to the model. Machine learning refinement may occur at different stages of the model and at different time points (e.g., using feedback to refine the machine learning model after deployment of the system 100).

The machine learning model, once trained, is configured to perform a particular task including, but not limited to, image classification (e.g., assigning a classification to an image or to objects in the image), image detection or identification (e.g., detecting the presence of different types of objects in an image), semantic interpretation (e.g., understanding the meaning of text, such as a CAD call narrative), and interpretation of sensor data such as sound, access control events, etc. Thus, the results produced by the machine learning model include an outcome of the particular task (e.g., vehicle classification and/or identification, person classification, or the like) for which the machine learning model is trained. In one embodiment, the machine learning model, once trained, operates on the event occurrence records (or the images contained therein) in order to classify the event occurrence records, identify elements of the event occurrence records, detect elements in the event occurrence records, or the like.

A client device 104 may be a remote computing device. One or more client devices 104 may be provided, in close proximity to one another, for instance located in the same office or data center, or remote from one another, for instance located in different offices and data centers dispersed across the same city or in different cities altogether.

The client device 104 is in communication with the I/O interface(s) 114 of the server system 102. The computing device 104 has a processor 118, a memory 120, and I/O interface(s) 116 that may be linked via bus connections. The computing device 104 may have (or be connect to) any suitable I/O device(s) 122, for example, such as a keyboard, a mouse, a touchscreen, etc. The client device 104 may be a desktop computer, a laptop, a smartphone, a tablet, etc. The client device 104 has (or is connect to) a display 124 (e.g. a screen, a tactile display, etc.). The processor 118, the memory 120 and the I/O interface(s) 116 may be similar to the processor 110, the memory 112 and the I/O interface(s) 114, respectively.

A client application program may be stored in memory of the client device 104 that is associated with the server system 102, the client application program providing the user with an interface to interact with the server system 102. The client application program could be a web browser or web application, that is used to interface with the server system 102.

In some embodiments, the server system 102 may include at least one client device 104, where, for instance, the connection between the server system 106 and the client device 104 may be a wired connection. In some embodiments, the functionality of the server system 102 and the client device 104 may be implemented on a single computing device.

The client device 104 may be operated by user(s) (e.g., police officer(s) or other authorized user(s)) to provide one or more witness statements to the server system 102. In some embodiments, the client device 104 may be operated by a law enforcement officer (or other authorized user) to receive the witness statement(s), perform a query for matching event occurrence record(s), and review results. It should however be understood that a witness may operated the client device 104 to provide their witness statement. For example, a first client device 104 may be operated by the witness to provide their statement and a second, different, client device 104 may be operated by the law enforcement officer to perform the query and review results. Using the client device 104, the witness statement(s) may be provided in real-time (i.e. as the witness statement is received by the user) or with a delay (i.e. a predetermined time period after the witness statement is received). The client device 104 may be configured to launch a web browser or web application (not shown) that renders a graphical user interface (GUI) on the display 124. The GUI may be used to display outputs and accept inputs and/or commands from user(s) of the client device 104, as will be described further below.

The system 100 may comprise a wide variety of different network technologies and protocols. Communication between the server system 102, data source(s) 108, and client device 104 may occur across wired, wireless, or a combination of wired and wireless networks. The system 100 may include any number of networking devices such as routers, modems, gateways, bridges, hubs, switches, and/or repeaters, among other possibilities, communicatively coupled to the server system 102, data source(s) 108, client device 104 and/or at any point along network 106.

For purposes of illustration, reference is made herein to a system 100 used for security purposes, such as the identification of a crime associated with a known felon, the identification of a stolen vehicle, or the like. However, it should be understood that the system 100 may be used for any other suitable purpose, such as for identifying at least one person that might have witnessed an incident or for searching for a vehicle in a parking lot based on entrance camera events (e.g., when a person does not remember where he or she parked their vehicle).

Figure 2A:
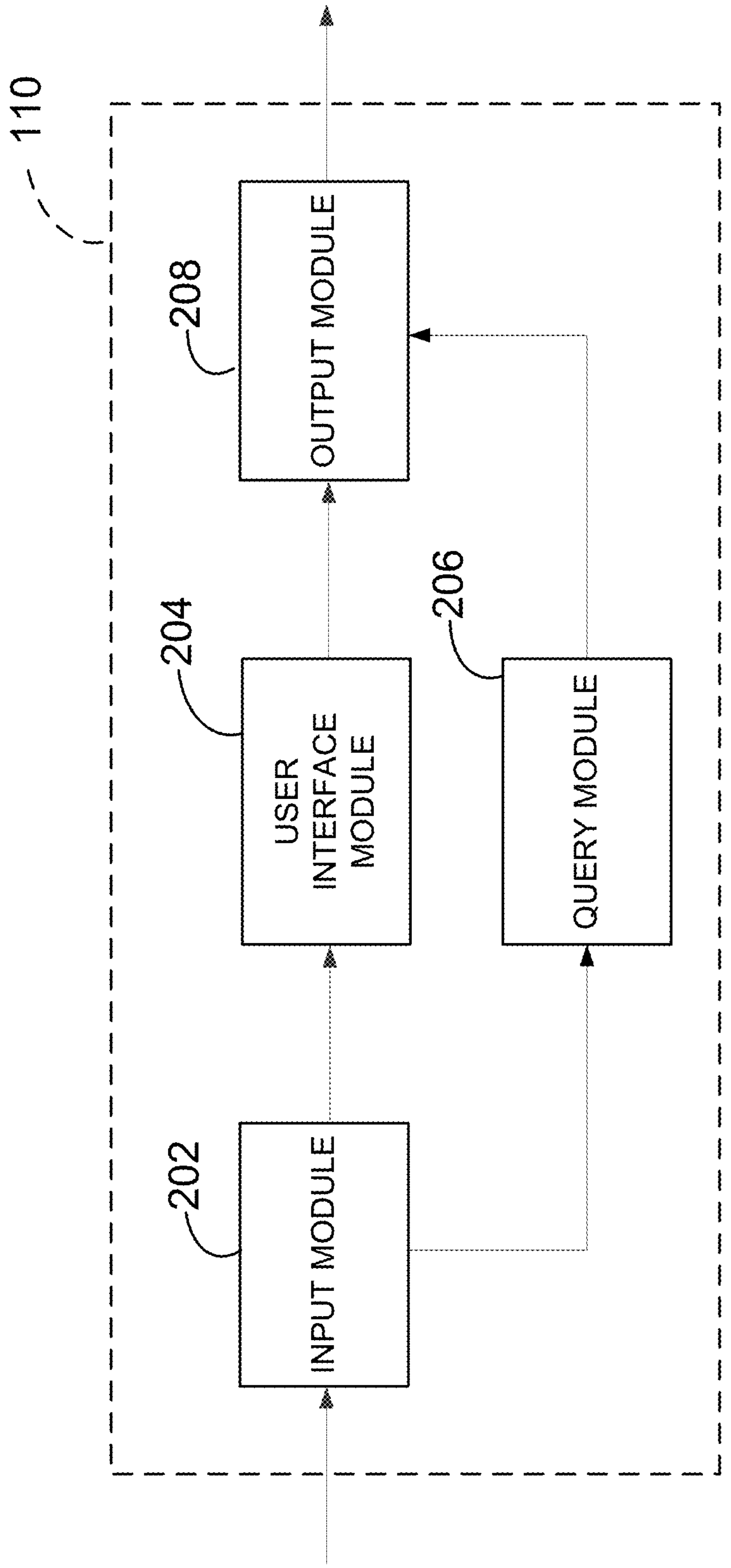
FIG. 2A is a schematic diagram illustrating components of the processor of the server system of FIG. 1, in accordance with an illustrative embodiment.
Figure 2B:
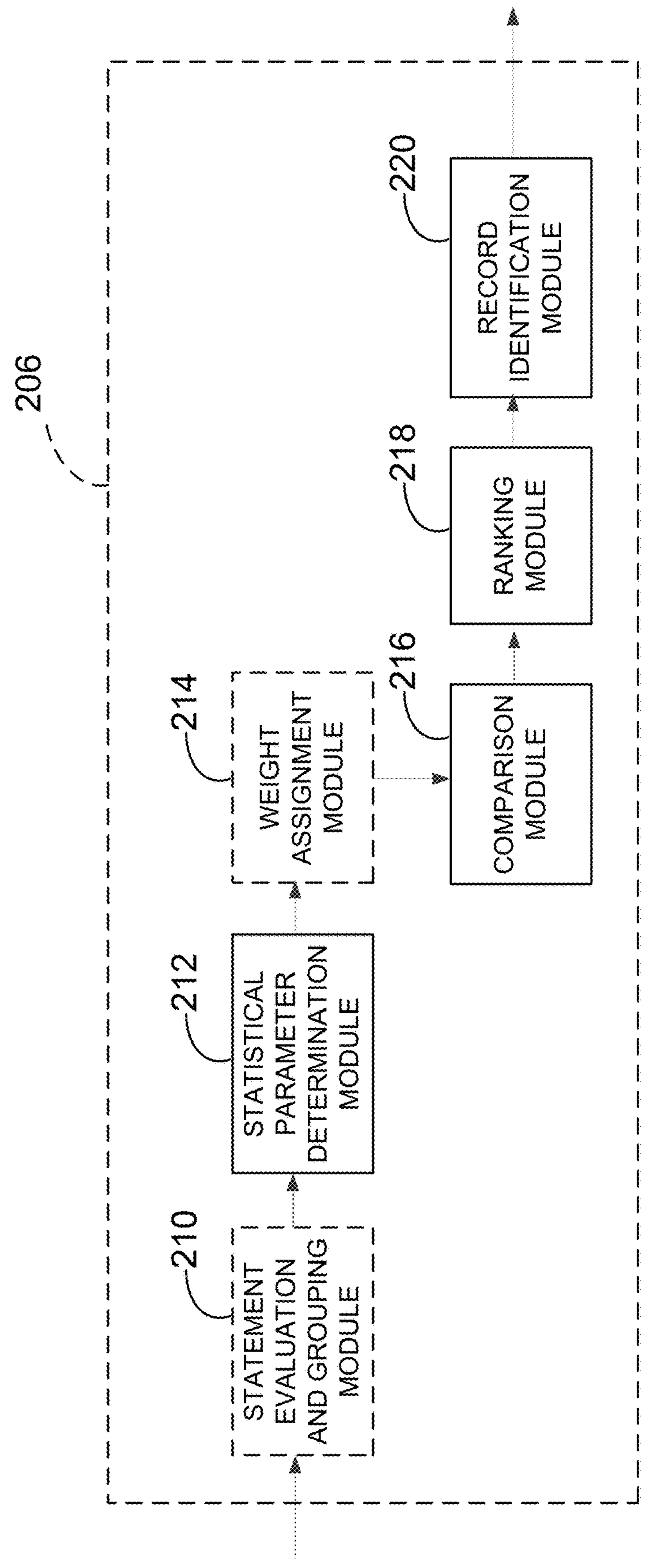
FIG. 2B is a schematic diagram of the query module of FIG. 2A, in accordance with an illustrative embodiment.

Referring now to FIG. 2A and FIG. 2B, the processor 110 illustratively comprises an input module 202, a user interface module 204, a query module 206, and an output module 208. The input module 202 is configured to accept inputs and/or commands from user(s) of the client device 104 and the output module 208 is configured to display outputs (e.g., via a GUI) on the display 124 of the client device 104 (and/or to render outputs via any other suitable output device associated therewith).

The user interface module 204 is illustratively configured to generate the GUI that is to be rendered on the display 124 of the client device 104. In one embodiment, the user interface module 204 is configured to generate one or more user interface elements to be rendered on the GUI in order to enable the systems and methods described herein. The user interface element(s) may include, but are not limited to, buttons, text box elements, pop-up elements, icons, and the like. The user interface module 204 outputs instructions to the output module 208 to trigger the display of the GUI, including the user interface elements, on the client device 104. A user may then interact with the GUI and the user interface elements using any suitable input device (e.g., mouse, touchscreen, keyboards, etc.) associated with the client device 104, in order to provide their witness statement(s). The input module 202 is configured to receive any input data generated in response to the user interacting with the GUI.

Figure 3A:
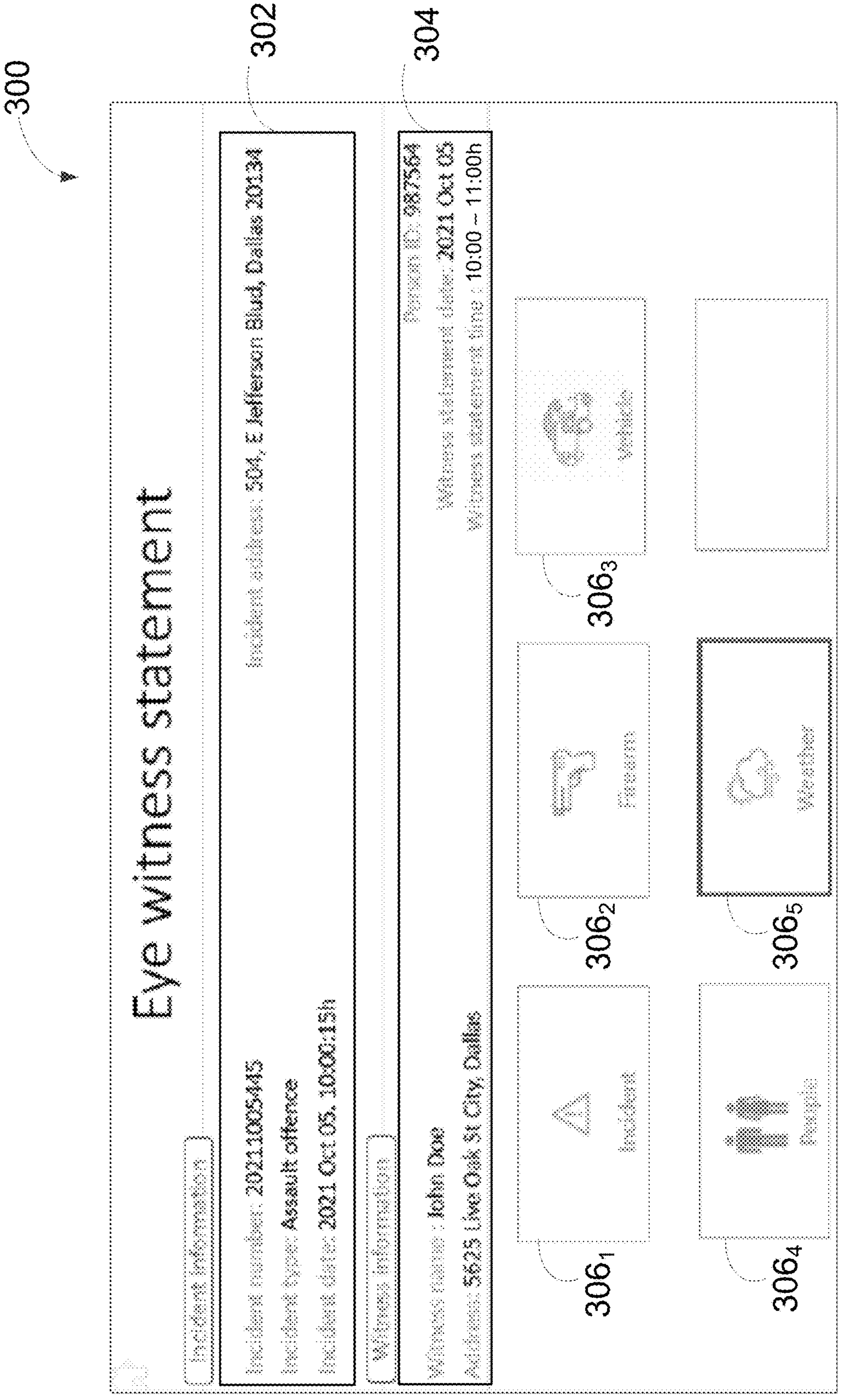
FIGS. 3A, 3B, and 3C illustrate an example graphical user interface generated by the system of FIG. 1, in accordance with an illustrative embodiment.
Figure 3B:
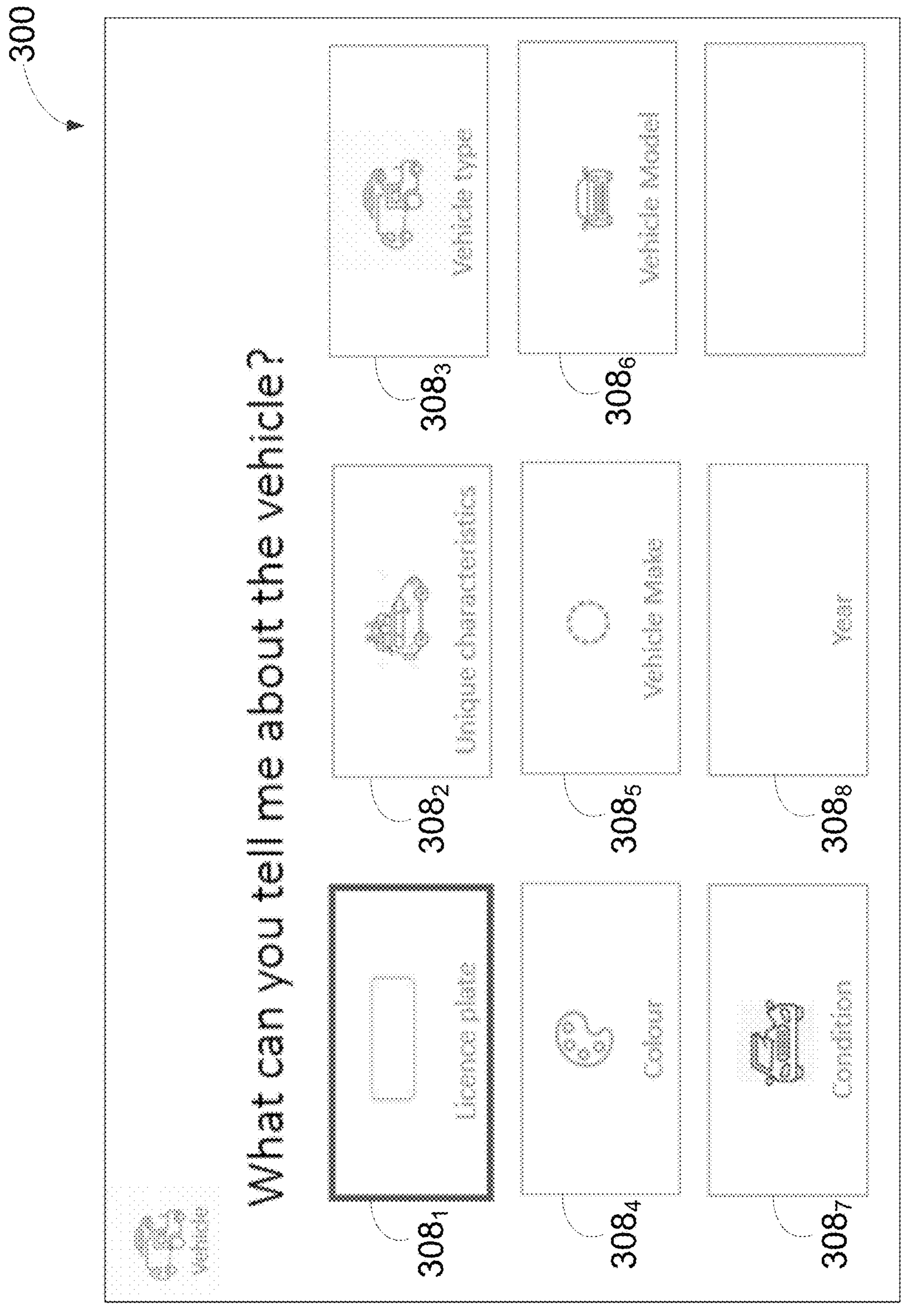
Figure 3C:
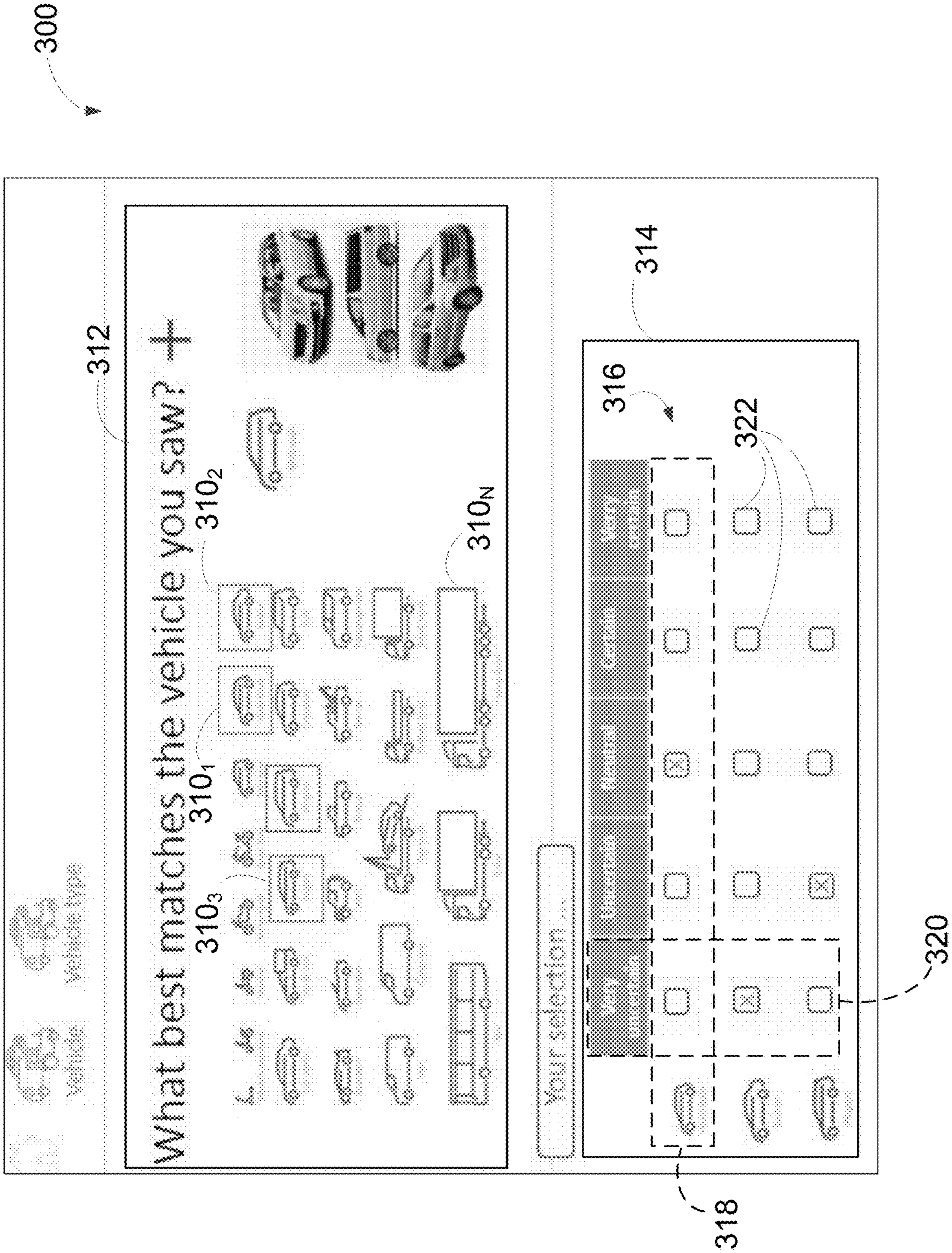

FIGS. 3A, 3B, and 3C illustrate an example GUI 300 that may be rendered on the display 124 of the client device 104. In the illustrated embodiment, the GUI 300 is used to provide an eye witness statement regarding an incident of the assault type. It should be understood that information about other types of incidents including, but not limited to, gunshot, theft, robbery, and vehicle searches may be provided. As shown in FIG. 3A, the information related to the incident (labelled on GUI 300 as "incident information") is provided in text box 302. The incident information includes the number (in this case "20211005445") assigned to the incident, the type of the incident (in this case "Assault offence"), the date and time of the incident (in this case "2021 Oct 05" and "10:00.15h", respectively), and the address (in this case "504, E Jefferson Blvd, Dallas 20134") at which the incident occurred. It should be understood that, depending on the type of incident, more or less incident information may be provided in text box 302. The information related to the witness (also referred to herein as "witness information") is also provided in text box 304. The witness information includes the name of the witness (in this case "John Doe"), the address of the witness (in this case "5625 Live Oak St City, Dallas"), the identifier (in this example "987564") assigned to the witness, the date of the witness statement (in this example "2021 Oct 05"), and the time of the witness statement (in this example "10:00-11:00h"). Any other relevant information may be provided.

The user interface elements rendered on the GUI 300 further comprise selectable icons $\mathbf{306_1}$, $\mathbf{306_2}$, $\mathbf{306_3}$, $\mathbf{306_4}$, $\mathbf{306_5}$ which are used for the user to specify the attributes related to their witness statement(s), as well as the confidence value associated with each attribute. It should be understood that while five (5) selectable icons $\mathbf{306_1}$, $\mathbf{306_2}$, $\mathbf{306_3}$, $\mathbf{306_4}$, $\mathbf{306_5}$ are shown in FIG. 3A, this is for illustrative purposes only and any suitable number of selectable icons as in $\mathbf{306_1}$, $\mathbf{306_2}$, $\mathbf{306_3}$, $\mathbf{306_4}$, $\mathbf{306_5}$ may apply. Each icon $\mathbf{306_1}$, $\mathbf{306_2}$, $\mathbf{306_3}$, $\mathbf{306_4}$, $\mathbf{306_5}$ is associated with one or more given attributes of the witness statement and allows, upon being selected, the user to specify the type of information they are providing. In the illustrated example, the "Incident" icon $\mathbf{306_1}$ allows the user to enter information relating to the incident itself, the "Firearm" icon $\mathbf{306_2}$ allows the user to enter information relating to any firearm(s) involved in the incident, the "Vehicle" icon $\mathbf{306_3}$ allows the user to enter information relating to any vehicle(s) involved in the incident, the "People" icon $\mathbf{306_4}$ allows the user to enter information relating to any people involved in the incident, and the "Weather" icon $\mathbf{306_5}$ allows the user to enter information relating to the physical environment within which the incident occurred, and more specifically about the weather on the day of the incident. It should be understood that each witness statement may comprise various attributes and additional information may therefore be provided.

Referring now to FIG. 3B, after the user selects a given icon $\mathbf{306_1}$, $\mathbf{306_2}$, $\mathbf{306_3}$, $\mathbf{306_4}$ or $\mathbf{306_5}$, the user is prompted to provide, via the GUI 300, further information about the selected witness statement attribute. Continuing with the previous example, after selecting the "Vehicle" icon $\mathbf{306_3}$, a new set of selectable icons $\mathbf{308_1}$, $\mathbf{308_2}$, $\mathbf{308_3}$, $\mathbf{308_4}$, $\mathbf{308_5}$, $\mathbf{308_6}$, $\mathbf{308_7}$, $\mathbf{308_8}$ are presented on the GUI 300 to prompt the user to provide information about the vehicle involved in the incident, along with a corresponding confidence value. In one embodiment, the information about the vehicle that the user is prompted to provide comprises, but is not limited to, at least part of a license plate number (i.e., the full license plate number or a few digits thereof), a state associated with the license plate number, a make of the vehicle, a type of the vehicle, a model of the vehicle, a model year of the vehicle, a colour of the vehicle, a condition (e.g., scratches, damage, or the like) of the vehicle, and at least one unique characteristic (e.g., accessories such as a bike rack, hitch, roof rack, spare tire, and the like) of the vehicle. It should be understood that while eight (8) selectable icons $\mathbf{308_1}$, $\mathbf{308_2}$, $\mathbf{308_3}$, $\mathbf{308_4}$, $\mathbf{308_5}$, $\mathbf{308_6}$, $\mathbf{308_7}$, $\mathbf{308_8}$ are shown in FIG. 3B, this is for illustrative purposes only and any suitable number of selectable icons as in $\mathbf{308_1}$, $\mathbf{308_2}$, $\mathbf{308_3}$, $\mathbf{308_4}$, $\mathbf{308_5}$, $\mathbf{308_6}$, $\mathbf{308_7}$, $\mathbf{308_8}$ may apply.

In the illustrated example, the "License plate" icon $\mathbf{308_1}$ allows the user to enter information about the vehicle's license plate (e.g. at least part of a license plate number), the "Unique characteristics" icon $\mathbf{308_2}$ allows the user to enter information about any characteristics of the vehicle, the "Vehicle type" icon $\mathbf{308_3}$ allows the user to enter information about the type of vehicle, the "Color" icon $\mathbf{308_4}$ allows the user to enter information about the vehicle color, the "Vehicle make" icon $\mathbf{308_5}$ allows the user to enter information about the make of the vehicle, the "Vehicle model" icon $\mathbf{308_6}$ allows the user to enter information about the vehicle model, the "Condition" icon $\mathbf{308_7}$ allows the user to enter information about the condition of the vehicle, and the "Year" icon $\mathbf{308_8}$ allows the user to enter information about the year of the vehicle.

It should be understood that information may be provided about any given attribute and that information may be provided about more than one attribute (e.g., in addition to previously provided information). Continuing with the previous example, the user may select to provide additional information regarding a person involved in the incident. This may be achieved by selecting any suitable interface element on the GUI 300 (e.g., a "Return" button, not shown) to return to a previous screen of the GUI 300 (illustrated in FIG. 3A) for selection of an additional attribute. For example, the user may select the "People" icon $\mathbf{306_4}$, which may cause a new set of selectable icons (other than the icons $\mathbf{308_1}$, $\mathbf{308_2}$, $\mathbf{308_3}$, $\mathbf{308_4}$, $\mathbf{308_5}$, $\mathbf{308_6}$, $\mathbf{308_7}$, $\mathbf{308_8}$ of FIG. 3B) to be presented on the GUI 300 to prompt the user to provide information about at least one person involved in the incident, along with a corresponding confidence value. Such information may comprise, but is not limited to, physical characteristics (e.g., height, hair color, eye color, etc.) and a physical appearance (e.g., type of clothing, color of clothing, type of shoes, colors of shoes, glasses, tattoos, scars, and any other identifying mark) of the at least one person.

Referring now to FIG. 3C, after the user selects a given icon $\mathbf{308_1}$, $\mathbf{308_2}$, $\mathbf{308_3}$, $\mathbf{308_4}$, $\mathbf{308_5}$, $\mathbf{308_6}$, $\mathbf{308_7}$, $\mathbf{308_8}$, the user is prompted to provide, via the GUI 300, additional information related to the attribute. Continuing with the previous example, after selecting the "Vehicle type" icon $\mathbf{308_3}$, a number (N) of selectable icons $\mathbf{310_1}$, $\mathbf{310_2}$, $\mathbf{310_3}$, . . . , $\mathbf{310_N}$ are presented in a first area 312 of the GUI 300 to prompt the user to provide information about the type of vehicle involved in the incident. It should be understood that any suitable number of selectable icons as in $\mathbf{310_1}$, $\mathbf{310_2}$, $\mathbf{310_3}$, . . . , $\mathbf{310_N}$ may apply. In one embodiment, the icons $\mathbf{310_1}$, $\mathbf{310_2}$, $\mathbf{310_3}$, . . . , $\mathbf{310_N}$ are representations (e.g., pictorial or hand-drawn representations) of different shapes and types (e.g., body styles and classifications) of vehicles, without any specific representation or reference being made to existing vehicles available from specific manufacturers. For example, the icons $\mathbf{310_1}$, $\mathbf{310_2}$, $\mathbf{310_3}$, . . . , $\mathbf{310_N}$ may comprise, but are not limited to, pictorial icons of cars (e.g., convertible, hatchback, sedan, wagon, coupé, Sport Utility Vehicles or SUV, . . . ), limousines, sports cars, busses, trucks, consumer trucks, semi-trucks, wagons, vans, minivans, caravans, delivery vans, dump trucks, tractors, scooters, kick scooters, bicycles, motorcycles, snowmobiles, etc. It should be understood that any suitable vehicle type may apply depending on the application and that the applicable vehicles are therefore not limited to land vehicles. Thus, icons related to vehicle types other than the ones illustrated in FIG. 3C may be presented on the GUI 300. For example, icons related to railed vehicles (e.g., trains, trams, subways, etc.), watercraft (e.g., ships, boats, canoes, kayaks, yachts, etc.) and/or aircraft (e.g., airplanes, helicopters, etc.) may apply.

Following selection of one or more icons 310$_1$, 310$_2$, 310$_3$, . . . , 310$_N$, one or more additional user interface elements are rendered in a second area 314 of the GUI 300. These additional interface elements may be positioned at any suitable location on the GUI 300 relative to the first area 312. In one embodiment, the additional user interface element comprises a table 316 with one or more rows 318 and one or more columns 320. Any other suitable format may apply. Each row 318 is representative of a given vehicle type chosen by the user, upon selecting a corresponding icon 310$_1$, 310$_2$, 310$_3$, . . . , 310$_N$. In the example of FIG. 3C, the user selected three (3) icons 310$_1$ (corresponding to the "Hatchback" vehicle type), 310$_2$ (corresponding to the "Sedan" vehicle type), and 310$_3$ (corresponding to the "Wagon" vehicle type), such that the table 316 comprises a row 318 for the vehicle type corresponding to each icon 310$_1$, 310$_2$, 310$_3$. Each column 320 is representative of a confidence value that indicates the user's degree of confidence in their vehicle type selection. In order to enable the user to indicate the confidence value, a plurality of selectable user interface elements (e.g., check boxes) 322 are provided in the table 316. By selecting a given user interface element 322, the user can assign a confidence value to a given attribute (e.g., vehicle type). In the example of FIG. 3C, the confidence value may be set to five (5) different levels, namely "Very uncertain", "Uncertain", "Neutral", "Certain", or "Very certain". The table 316 therefore comprises three (3) rows and five (5) columns 320. It can be seen from FIG. 3C that, for the "Hatchback" vehicle type, the confidence value has been set to "Neutral", for the "Sedan" vehicle type, the confidence value has been set to "Very uncertain", and for the "Wagon" vehicle type, the confidence value has been set to "Uncertain". Thus, in the illustrated example, the vehicle type having the highest confidence value is the "Hatchback".

Referring back to FIG. 2A, the input module 202 receives input data in response to one or more users providing witness statement(s) using the user interface elements presented on the GUI 300. The input module 202 in turn sends the input data related to the witness statements to the query module 206 for use in identifying one or more event occurrence records that match the witness statement(s). As illustrated in FIG. 2B, the query module 206 illustratively comprises an optional statement evaluation and grouping module 210, a statistical parameter determination module 212, an optional weight assignment module 214, a comparison module 216, a ranking module 218, and a record identification module 220.

Figure 4A:
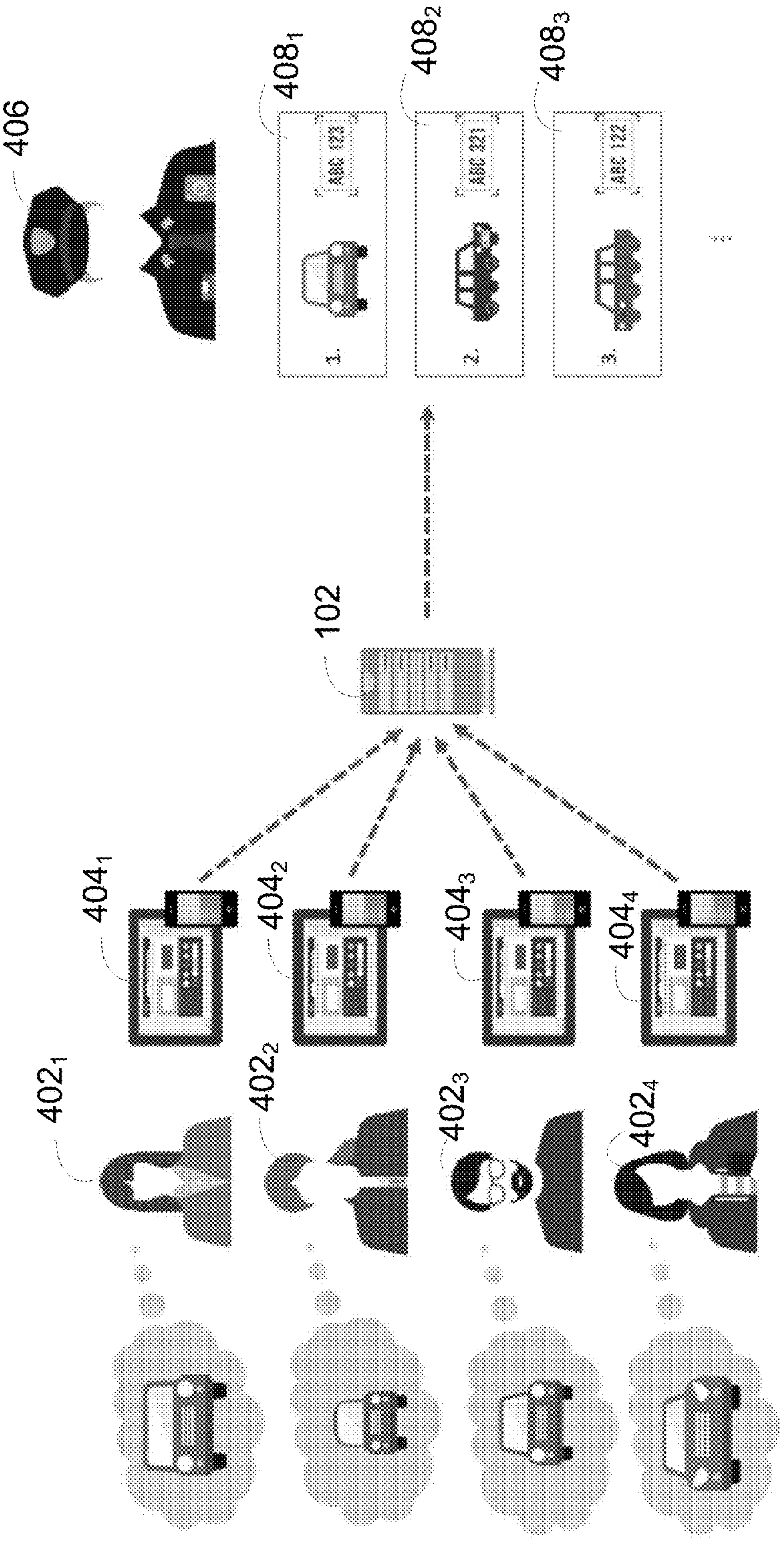
FIGS. 4A and 4B are schematic diagrams illustrating use of the system of FIG. 1 to identify records associated with vehicles, in accordance with an illustrative embodiment.

The statement evaluation and grouping module 210 may be used when multiple witness statements are received, to combine or group the witness statements. Indeed, it should be understood that, using the GUI 300, a user may provide one or more witness statements and multiple users may access the system 100 (e.g., simultaneously) using their client device 104 such that multiple statements from multiple witnesses may be provided, as illustrated in FIG. 4A. When there are multiple witnesses, each witness statement can vary. In the example of FIG. 4A, multiple witnesses 402$_1$, 402$_2$, 402$_3$, 402$_4$ provide different witness statements which may be submitted to the server system 102 using respective client devices 404$_1$, 404$_2$, 404$_3$, 404$_4$. In the illustrated embodiment, the witness statements are provided by an authorized user 406 (e.g., a police officer) and each witness 402$_1$, 402$_2$, 402$_3$, 402$_4$ provides, with some variance, a witness statement containing information about the color and type of a vehicle involved in an incident.

It should be understood that, while FIG. 4A illustrates that the witness statements from witnesses 402$_1$, 402$_2$, 402$_3$, 402$_4$ are provided using different client devices 404$_1$, 404$_2$, 404$_3$, or 404$_4$, all witness statements may be entered into a same client device (e.g., client device 404$_1$), for example by the authorized user 406. In some embodiments, a witness may enter information related to their witness statement with the assistance of the authorized user 406. This may be particularly useful for impaired or otherwise unable witnesses.

In one embodiment, the statement evaluation and grouping module 210 may be configured to combine the multiple witness statements into a combined witness statement and the combined witness statement may then be used to query the data source(s) 108 (or memory 112) to identify at least one event occurrence record that matches the combined witness statement. In the example of FIG. 4A, the multiple witness statements received from the witnesses 402$_1$, 402$_2$, 402$_3$, 402$_4$ are combined and used by the server system 102 to identify three (3) event occurrence records 408$_1$, 408$_2$, 408$_3$ that match the received witness statements.

In another embodiment, the statement evaluation and grouping module 210 may be configured to evaluate the received witness statements to identify similar witness statements. This may, for example, be achieved by comparing the attributes of the witness statements to identify similarities. In some embodiments, a threshold may be used to identify similarities. For example, witness statements having attributes that exceed the threshold (e.g., witness statements with over a given number of attributes of a predetermined category) may be identified as being similar. The statement evaluation and grouping module 210 may then form a grouping of similar witness statements and the grouping may be used to query the data source(s) 108 (or memory 112) to identify at least one event occurrence record that matches the grouping of similar witness statements.

In yet other embodiments, the statement evaluation and grouping module 210 may be configured to compare the witness statements (e.g., compare attributes thereof) to identify any anomalous (or outlier) witness statement. A witness statement that diverges (e.g., has notably different attributes) from other witness statements may be considered anomalous. Such an anomalous witness statement may be the result of a bad recollection on behalf of the witness, may be due to the witness' location or field of view relative to the incident, or may be indicative of a malicious effort to provide a misleading witness statement. An indication of the witness statement being anomalous may then be output by the statement evaluation and grouping module 210, e.g. sent to the output module 208 for presentation on the display 124 of the client device 110.

Figure 4B:
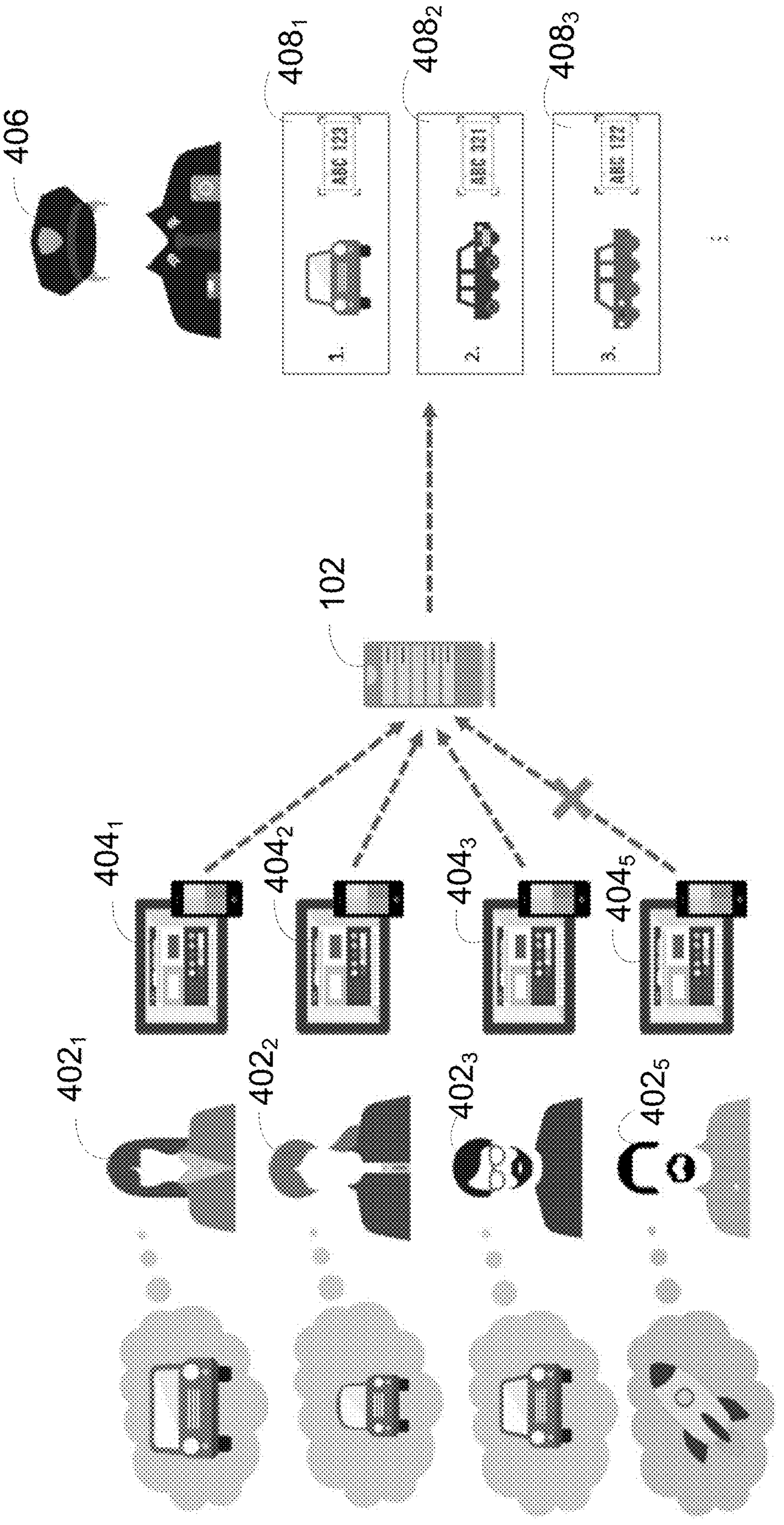

FIG. 4B illustrates an example in which an anomalous witness statement is received from a witness 402$_5$ and provided to the server system 102 using client device 404$_5$. Upon receipt of the witness statements, the statement evaluation and grouping module 210 may determine a discrepancy between the attributes of the witness statement provided by witness 402$_5$ and the attributes of the witness statements provided by the witnesses 402$_1$, 402$_2$, 402$_3$. In the illustrated example, the attribute associated with the witness statements is the type of vehicle involved in the incident. While all witnesses 402$_1$, 402$_2$, 402$_3$ have indicated the vehicle type to be a car, witness 402$_5$ has indicated it to be another type (e.g., a rocket in the illustrated example).

The statement evaluation and grouping module 210 detects the discrepancy and outputs an indication to this effect in order to cause the anomalous witness statement to not be taken into consideration in the query performed at the server system 102.

Once the witness statements have been received, and optionally evaluated and grouped, they are sent to the statistical parameter determination module 212, which is configured to determine one or more statistical parameters of the witness statement attributes and one or more statistical parameters of the event occurrence record attributes. The statistical parameters of the witness statement attributes may be the same or different from the statistical parameters one or more statistical parameters of the event occurrence record attributes. Once determined, the statistical parameters are then used to identify the at least one event occurrence record that matches the witness statements. In one embodiment, the statistical parameter(s) comprise a probability distribution that may be expressed as a vector of probabilities. For example, for the vehicle color attribute, the vector of probabilities may comprise a 30% probability for red, a 25% probability for blue, and a 10% probability for green. Other embodiments may apply.

In some embodiments, the statistical parameters of the witness statement attributes are based on the confidence values in the witness statements. In other words, the user's confidence values may be converted to statistical parameters. For example, if a user selected three different vehicle types with three different confidence values (e.g., as shown in the second area 314 of the GUI 300 of FIG. 3C), the statistical parameter determination module 212 may be configured to apply an algorithm to obtain statistical parameters for each of the different vehicle types, based on all three vehicle type selections and on the corresponding confidence values. By way of another example, the statistical parameter determination module 212 may be configured to convert non-mathematical confidence values to a percentage value, in order, for instance, to be compatible with the confidence values in the event occurrence records. This may, for example, apply if the user did not make multiple selections for a given attribute (e.g., did not select multiple vehicle types).

The statistical parameter determination module 212 may be further configured to assign a confidence value to the event occurrence record attributes, based on the statistical parameters as determined. Such a confidence value may be indicative of the accuracy of the determination made by the statistical parameter determination module 212. In some embodiments, the statistical parameter determination module 212 may be configured to cause the statistical parameter(s) of the event occurrence record attributes and the corresponding confidence values to be stored in the data source(s) 108 (or memory 112).

The weight assignment module 214 may optionally be used to assign one or more weights to each witness statement. Any suitable technique or formula may be used to assign a weight. In one embodiment, the weight is assigned to each witness statement attribute based on its type and on the confidence value associated with the attribute. Different weights (e.g., having different discrete values) may be assigned to different attributes. For example, the weight assigned to vehicle color may have a higher value than the weight assigned to the vehicle model. The data sources(s) 108 (or memory 112) may also comprise event occurrence records with attributes each having a weight assigned thereto based on the type of the attribute and on the confidence value associated therewith. In some embodiments, the weight may be assigned based on the configuration of the system 100. For example, for a system 100 that is configured to achieve optimized results using license plate reads, the license plate number attribute may be assigned a higher weight than other vehicle attributes such as color, make or model.

The statistical parameters and the optionally weighted witness statements are then sent to the comparison module 216, which is configured to compare the witness statement attributes to the event occurrence record attributes to identify the at least one event occurrence record that matches the witness statements. The comparison may be performed based on individual witness statements or witness statements as a whole (e.g., a combined witness statement or a grouping of witness statements, as described herein). For this purpose, the comparison module 216 is configured to compute one or more similarity metrics between the statistical parameter(s) of the witness statement attributes and the statistical parameter(s) of the event occurrence record attributes. In some cases, based on the time and location of the incident, the comparison module 216 may only look for event occurrence records related to events occurring in the vicinity of the incident and around the time of the incident, in order to compute the similarity metric(s). In one embodiment, the similarity metric(s) comprise one or more distance metrics computed using any suitable technique. For example, the comparison module 216 may be configured to perform a distance calculation between each statistical parameter(s) of the witness statement attributes and each corresponding statistical parameter(s) of the event occurrence record attributes.

In one embodiment, the distance calculation may be performed based on a difference between statistical parameters of given attribute(s) alone. For example, the comparison module 216 may be configured to compute a distance between the probability distribution of vehicle color from the witness statement(s) and vehicle color from the event occurrence records. If a witness statement indicates that the color of the vehicle involved in the incident is read with high certainty, the comparison module 216 computes a distance between the vehicle color attribute associated with each event occurrence record. In this manner, any event occurrence record for which the vehicle color is red can be subsequently identified as a match with the witness statement. In another embodiment, the distance calculation may be performed based on a difference between statistical parameters of multiple attributes taken in combination. For example, the comparison module 216 may be configured to compute a distance between the probability distributions of vehicle color, vehicle make, and vehicle model from the witness statement(s), and vehicle color, vehicle make, and vehicle model from the event occurrence records. In yet another embodiment, the distance calculation may be performed based on a difference between statistical parameters of multiple attributes in a weighted combination, to favour some attributes over others. For example, the comparison module 216 may be configured to compute a distance between the probability distributions of vehicle color, vehicle make, and vehicle model from the witness statement(s) and vehicle color, vehicle make, and vehicle model from the event occurrence records, with vehicle color being assigned a weight of greater value than vehicle make and model.

In one embodiment, a ranking may be assigned to the similarity metric(s) computed by the comparison module 216. The ranking may be used to identify the at least one event occurrence record that matches the witness statements. For this purpose, the comparison module 216 outputs the similarity metric(s) to the ranking module 218, which may in turn assign the ranking. The closest distance metric (i.e. the distance metric having the smallest value, which may indicate that the statistical parameter of a given witness statement attribute and the statistical parameter of a given event occurrence record attribute have the greatest similarity) may be assigned the highest ranking, and vice versa. In this case, the ranking may comprise discrete values. For example, the ranking may be from 1 to 5, with 1 being the lowest rank and 5 being the highest rank. In other words, the statistical parameters can be sorted based on closest similarity. In other embodiments, the ranking module 218 may be configured to compare the distance metrics to a distance threshold and rank the metrics based on the outcome of the comparison to the threshold. For example, distance metrics that are above the distance threshold (which may indicate that the statistical parameter of a given witness statement attribute and the statistical parameter of a given event occurrence record attribute have low similarity) may be assigned a lower ranking than distance metrics that are below the distance threshold. Other embodiments may apply.

In some embodiments, the ranking module 218 may be further configured to output the ranking to the output module 208 for presentation on the display 124 of the client device 110. For example, results with the highest ranking (e.g., rank 5) may be rendered on the display 124. Alternatively, results that are above a given threshold (e.g., the topmost results for which the distance metric is above the distance threshold) may be rendered. Although reference is made herein to the ranking being output, it should be understood that, in other embodiments, a percentage (e.g., a 90% match) may be computed based on the similarity metric to indicate the extent of the match and the percentage may be output by the output module 208. The record identification module 220 may then receive the ranking from the ranking module 218 and used to identify, based on the ranking, the at least one event occurrence record that matches the witness statements. This may, for example, be achieved by selecting, among the displayed records, the event occurrence record having the highest ranking associated therewith. In some embodiments, such selection, and accordingly the record identification, is performed by a user, based on the information rendered on the client device 110.

FIG. 5A illustrates an example flowchart of a record identification method 500, in accordance with one embodiment. The steps of the method 500 may be performed in the manner described above in relation to FIGS. 1 to 4B. Step 502 comprises receiving, from one or more users (e.g., via the GUI 300 described above in relation to FIG. 3A, FIG. 3B, and FIG. 3C), witness statement(s) relating to an incident. The witness statement(s) each have attributes and each attribute has a confidence value associated therewith. Step 504 comprises querying, using the witness statement(s) and the confidence value associated with each attribute, at least one database (e.g., data source(s) 108 or memory 112 of FIG. 1) to identify at least one event occurrence record that matches the witness statement(s). Step 506 comprises outputting the at least one event occurrence record identified at step 506.

Figure 5B:
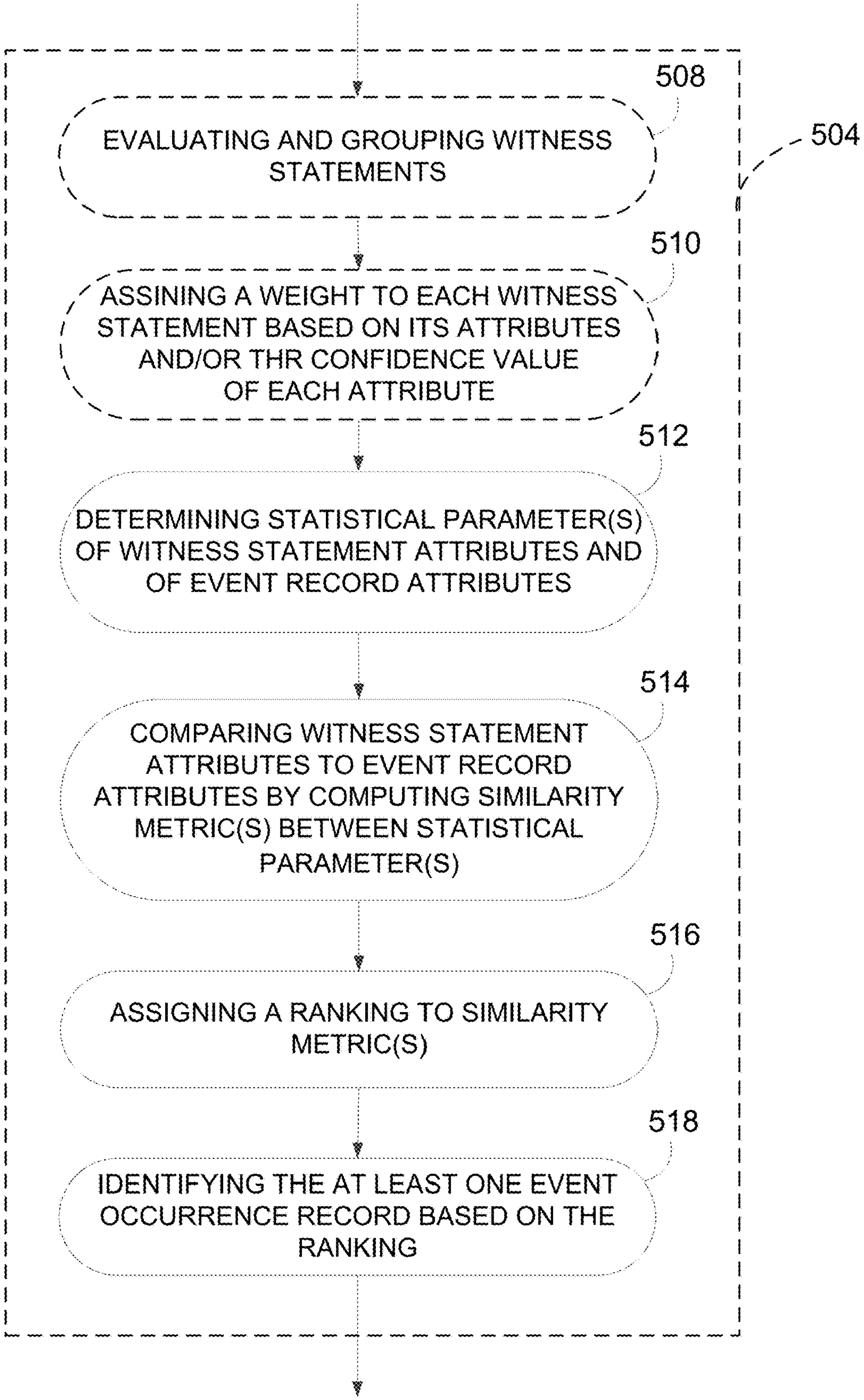
FIG. 5B is a flowchart of the querying step of FIG. 5A, in accordance with an illustrative embodiment.

Referring to FIG. 5B, the step 504 of querying the at least one database to identify the at least one event occurrence record that matches the witness statement(s) illustratively comprises optionally grouping witness statements in step 508. Optional step 510 comprises assigning a weight to each witness statement based on its attributes and/or the confidence value of each attribute. Step 512 comprises determining one or more statistical parameters of the attributes of the witness statement(s) (referred to herein as "witness statement attributes") and of attributes of the event occurrence records (referred to herein as "event occurrence record attributes"). Step 514 comprises comparing the witness statement attributes to the event occurrence record attributes by computing one or more similarity metrics between the statistical parameter(s) of the witness statement attributes and the statistical parameter(s) of the event occurrence record attributes. Step 516 comprises assigning a ranking to the similarity metric(s) computed at step 514 and step 518 comprises identifying the at least one event occurrence record that matches the witness statement(s) based on the ranking. In some embodiments, step 518 may further comprise outputting the ranking.

FIG. 5C illustrates an example flowchart of a record identification method 520, in accordance with another embodiment. The steps of the method 520 may be performed at a computing device having a machine learning model (such as described above with reference to FIG. 1) operating therein. Step 522 comprises obtaining (e.g., retrieving from at least one database) one or more event occurrence records indicative of occurrence of at least one event. Each occurrence record has a first plurality of attributes (or event occurrence record attributes) associated therewith. Step 524 comprises executing the machine learning model to determine a probability distribution (e.g., expressed as a vector of probabilities) of the first plurality of attributes. The machine learning model may be trained in the manner described below with reference to FIG. 5D. Step 526 comprises receiving one or more witness statements relating to an incident. Each witness statement is structured as a probability distribution and has a respective second plurality of attributes (or witness statement attributes) associated therewith. As previously noted, the first and the second plurality of attributes (i.e. the event occurrence record attributes and the witness statement attributes) may be the same or different attributes, although some overlap between the witness statement attributes and the event occurrence record attributes is desirable. The witness statements may be received at step 526 via the GUI 300 described above in relation to FIG. 3A, FIG. 3B, and FIG. 3C. Step 528 comprises comparing the probability distribution of the first plurality of attributes (as determined at step 524, using the machine learning model) to a probability distribution of the respective second plurality of attributes. The step 528 may comprise computing one or more similarity metrics (e.g., a distance, such as a Kullback-Leiber (KL) divergence) between the probability distributions. In some embodiments, step 528 comprises assigning a ranking to the similarity metric(s). Step 530 comprises identifying, based on the comparison performed at step 528, at least one event occurrence record for which the probability distribution of the first plurality of attributes matches the probability distribution of the respective second plurality of attributes. In some embodiments, the at least one event occurrence record may be identified at step 530 based on the ranking of similarity metric(s). Step 532 comprises outputting the at least one event occurrence record as identified.

In some embodiments, the step of identifying the at least one event occurrence record described herein (e.g., at step 504 of FIG. 5A or at step 518 of FIG. 5B) may entail outputting the ranking of similarity metric(s) (e.g., on the display of the client device 110, as described herein above with reference to FIG. 2B). For instance, results with the highest ranking (i.e. the closest match), results that are above a given threshold (i.e. all matches within a predetermined closeness), or a predetermined number of results (e.g., a predetermined number of closest matches) may be rendered. In other embodiments, an indication of the extent of a match may be determined (e.g., by computing a percentage based on the similarity metric) and output. A user may then identify the at least one event occurrence record based on the ranking (or other indication of the extent of the match) presented on their client device 110.

Figure 5D:
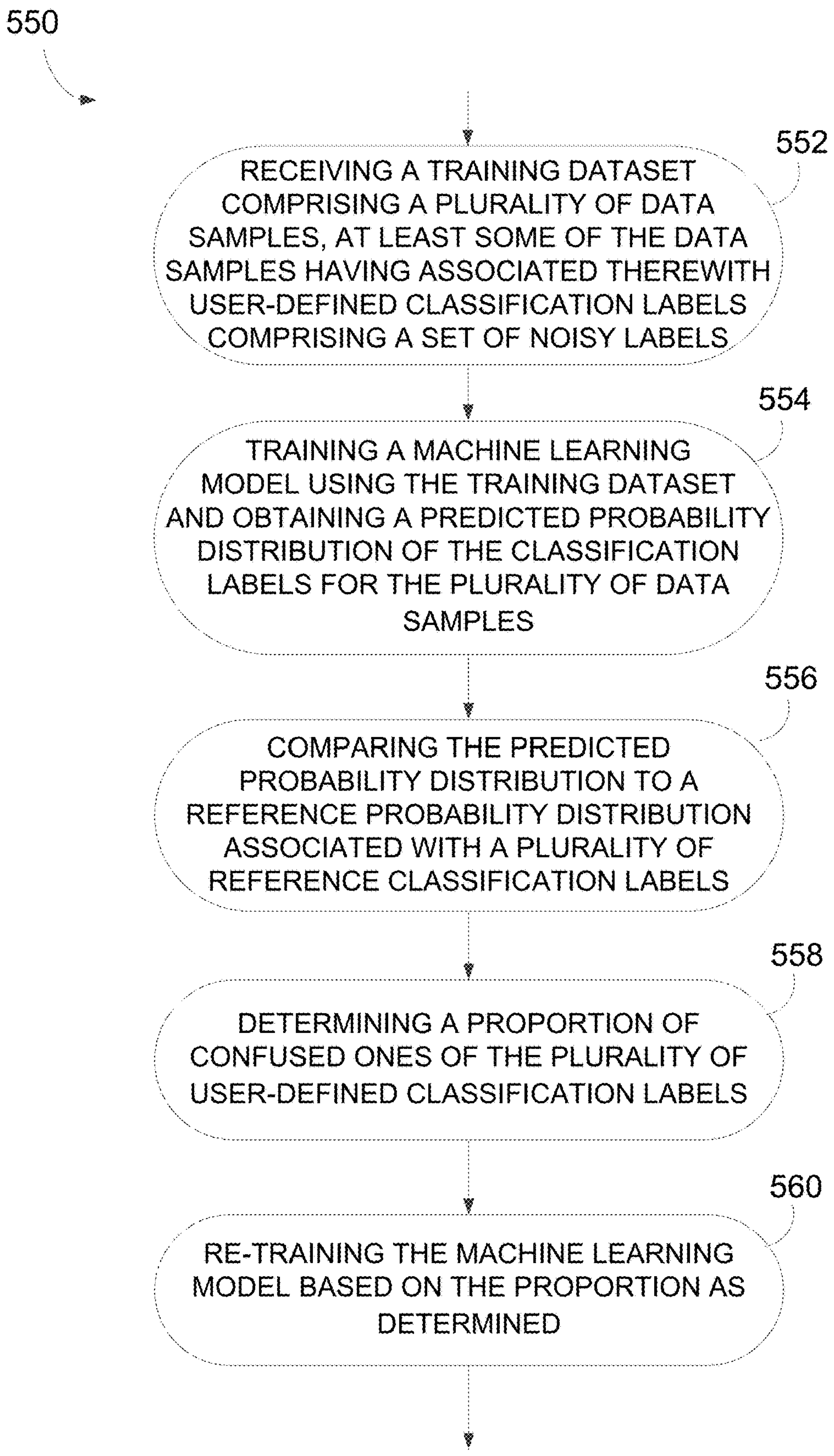
FIG. 5D is a flowchart of an example training method, in accordance with an illustrative embodiment.

FIG. 5D illustrates an example flowchart of a method 550 for training a machine learning model (e.g., the machine learning model used to perform the record identification method 520 of FIG. 5C), in accordance with one embodiment. The method 500 may be performed in advance, prior to the deployment of the record identification system (reference 100 in FIG. 1), in real-time, or partly in advance and partly in real-time. Step 552 comprises receiving a training dataset comprising a plurality of data samples. The data samples may comprise images and/or video footage relating to an incident, which may be captured by one or more cameras and/or video cameras deployed at one or more monitored locations encompassing a location of the incident. As described herein above, the images and/or video footage may depict vehicles, license plates and/or at least one registered person of interest.

Figure 6:
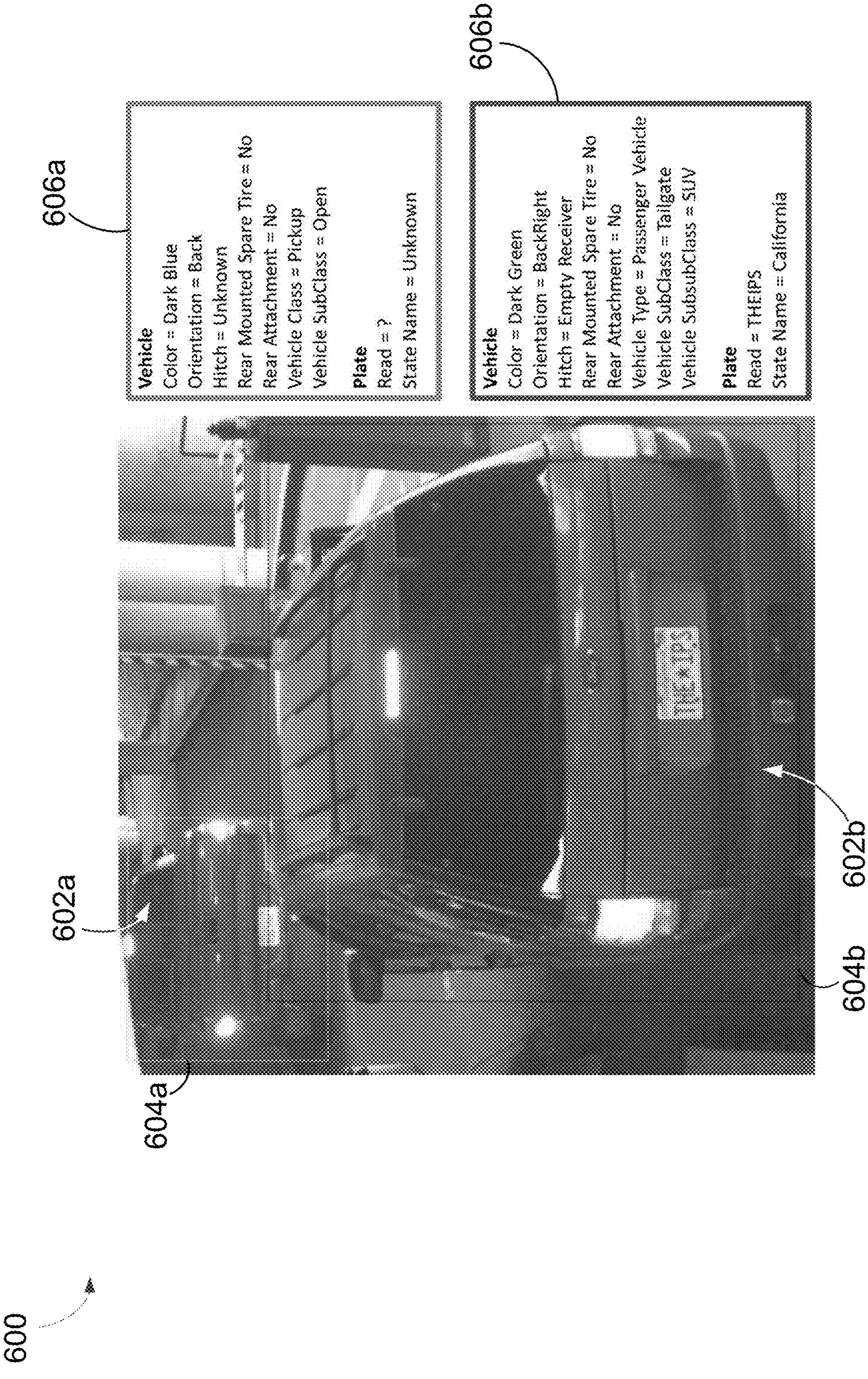
FIG. 6 illustrates an example image having classification labels assigned thereto, in accordance with an illustrative embodiment.

At least some of the data samples have associated therewith user-defined classification labels. As used herein, the term "classification labels" refers to identifying elements (also referred to as annotations, tags, or classes) which are assigned to the data samples during a process known as annotation or labelling. The classification labels are referred to herein as being "user-defined" because the labels are assigned by human users (e.g., experts, data professionals, or the like). Any suitable annotation method including, but not limited to, bounding boxes, semantic segmentation, polygon annotation, polylines annotation, landmark annotation, and three-dimensional (3D) cuboid annotation may be used. The classification labels may be defined to indicate what a piece of data is or relates to. For example, classification labels may be assigned to objects in the data samples (e.g., in the images and/or video footage) in order to point out important features in the images and/or video. FIG. 6 illustrates an example of an image 600 having classification labels assigned thereto during an annotation process. As can be seen in FIG. 6, the image 600 depicts two vehicles 602*a*, 602*b* entering a parking lot, each vehicle 602*a*, 602*b*, being delimited by a respective bounding box 604*a*, 604*b*. For each vehicle 602*a*, 602*b*, a respective text box element 606*a*, 606*b* is displayed which provides classification labels assigned for the respective vehicle 602*a*, 602*b*. In the illustrated example, the classification labels regarding the vehicle include the color, the orientation, the hitch (if known), whether a rear mounted spare tire is present, whether a rear attachment is present, the vehicle type (if known), the vehicle class, and the vehicle subclass, and the classification labels regarding the vehicle's plate include whether the plate was read and the plate's state name (if known). Other embodiments may apply.

In one embodiment, the user-defined classification labels may be indicative of attributes associated with the data samples. Examples of user-defined classification labels include, but are not limited to, a make, a type, a model, a model year, a colour, a condition, and at least one unique characteristic of at least one vehicle involved in an incident. Further examples of user-defined classification labels include, but are not limited to, at least one of physical characteristics and a physical appearance of at least one person involved in an incident.

The user-defined classification labels illustratively comprise a set of noisy labels. As used herein, the term "noisy label" refers to an incorrect or unreliable label that is assigned to a given data sample. In other words, a noisy label is indicative of a labelling discrepancy associated with at least one labelled data sample. One or more of the data samples may indeed be misclassified due to human error or other factors (e.g., malicious intent or when some data samples are difficult to classify) and have noisy labels associated therewith. It should be understood that noisy labels occur spontaneously as part of the classification process; different human reviewers will interpret similar visual phenomena in different ways, thereby creating noisy labels. For example, human labelers may produce noisy labels when the labelling task is ambiguous (e.g., classes such as color or vehicle type are to be assigned to the data) and the input from the human labelers may therefore have some degree of fuzziness. For instance, a vehicle may be classified as "red" by a first reviewer, but should a different reviewer be asked to classify the same vehicle, they may classify it as "burgundy", "orange", or a different colour, depending on their perspective.

In some embodiments, the user-defined classification labels further comprise a set of undefined labels. As used herein, the term "undefined label" is indicative of a data sample (referred to herein as an "outlier data sample") for which no previously defined labels exist. In other words, an undefined label is indicative of a labelling uncertainty associated with an outlier data sample. For example, an undefined label may be used when the human labeler is not able to assign a label to the outlier data sample, so the human labeler may indicate "unknown" or leave a field blank when labelling. The set of undefined labels is then used, at step 554, to train the machine learning model, where, during training, the corresponding data samples (i.e. the outlier data samples) are presented to the machine learning model with a vector of zeros as the expected output.

Step 554 comprises training the machine learning model using the training dataset and obtaining, at an output of the machine learning model, a predicted probability distribution of the classification labels for the plurality of data samples. Step 556 comprises comparing the predicted probability distribution to that of a plurality of reference classification labels. The reference classification labels may be retrieved from at least one database, memory, or other suitable storage device. In some embodiments, the reference classification labels may be user-defined (e.g., assigned by human users during an annotation or labelling process). Step 558 comprises determining, based on the comparison performed at step 556, a proportion of confused ones of the plurality of user-defined classification labels. Step 560 comprises re-training the machine learning model based on the proportion as determined. The step 560 of re-training the machine learning model may be repeated until the proportion of confused classification labels reaches a desired threshold. For example, the step 560 may be performed until a loss function (e.g., a distance or KL divergence) between the output of the machine learning model (i.e. the predicted probability distribution of the classification labels obtained at step 554) and a probability distribution of the confused classification labels (obtained at step 558) is minimal (i.e. below a distance threshold). Steps 558 and 560 may also be repeated for multiple iterations until the difference between the proportion of confused classification labels obtained at step 558 of a current iteration and the proportion of confused classification labels obtained at step 558 of the iteration prior to the current iteration is below a desired threshold. It may however be understood that, in some embodiments, steps 558 and 560 may only be performed once.

Figure 7:
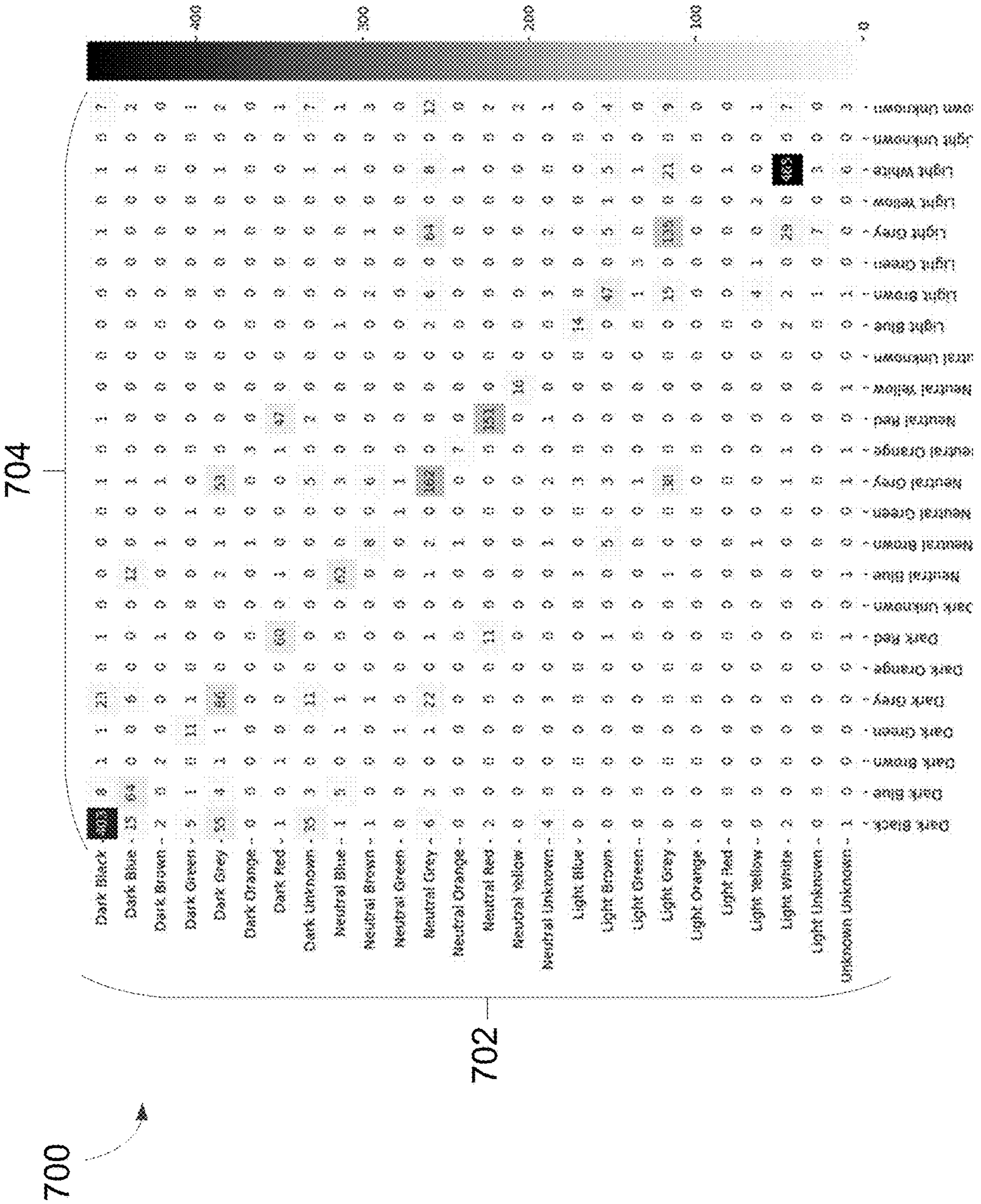
FIG. 7 illustrates an example confusion matrix, in accordance with an illustrative embodiment.

Any suitable technique may be used at step 556 to determine the proportion of confused classification labels. In some embodiments, step 558 comprises generating (using any suitable technique) a confusion matrix indicative of the proportion of confused labels. In some embodiments, the confusion matrix may be computed for a dataset (also referred to herein as a "validation set" or a "test set") that is independent (i.e. different) from the training dataset. As used herein, the term "confusion matrix" refers to a matrix of numbers that provides a mapping of predicted classes output by a classification model for a given dataset to original classes to which the dataset belongs. The confusion matrix provides a summary of the classification model's performance by indicating where the model gets confused. In one embodiment, the confusion matrix has a plurality of rows representative of the user-defined classification labels output by the machine learning model and a plurality of columns representative of the reference classification labels. The data from the rows of the confusion matrix can then be used as an input to the machine learning model for re-training the machine learning model at step 560. FIG. 7 illustrates an example of a confusion matrix 700 comprising a plurality of rows 702 and columns 704. As can be seen from FIG. 7, the example confusion matrix 700 concerns classification labels associated with vehicle color (e.g., dark black, dark blue, dark brown, etc.).

As previously noted, one or more parameters (e.g., weights) of the machine learning model may be tuned at different points in time in order to improve the model's accuracy. For this purpose, one or more loss functions, which characterize how well the machine learning model performs over the training dataset, may be computed and used during an optimization phase to reduce the model's error in prediction. In some embodiments, the method 550 may comprise determining a classification loss which is indicative of an error between the reference classification labels and the user-defined labels, and adjusting the one or more parameters of the machine learning model based on the classification loss. For example, a binary classification loss function may be computed. In particular, step 556 of comparing the predicted probability distribution of classification labels (obtained at step 554) to the reference probability distribution of classification labels may entail determining as the classification loss a cross entropy loss (or a binary cross entropy loss) between the predicted probability distribution and the reference probability distribution. The method 550 may also comprise determining a distance between two probability distributions. For instance and as noted herein above, KL divergence may be used during the re-training step 560, to determine the distance (i.e. the error) between the initially predicted probability distribution of classification labels (obtained at step 554) and the proportion of confused classification labels (obtained at step 558). The one or more parameters of the machine learning model may then be adjusted based on the classification loss (e.g., based on the cross-entropy loss and/or the KL divergence).

Figure 8:
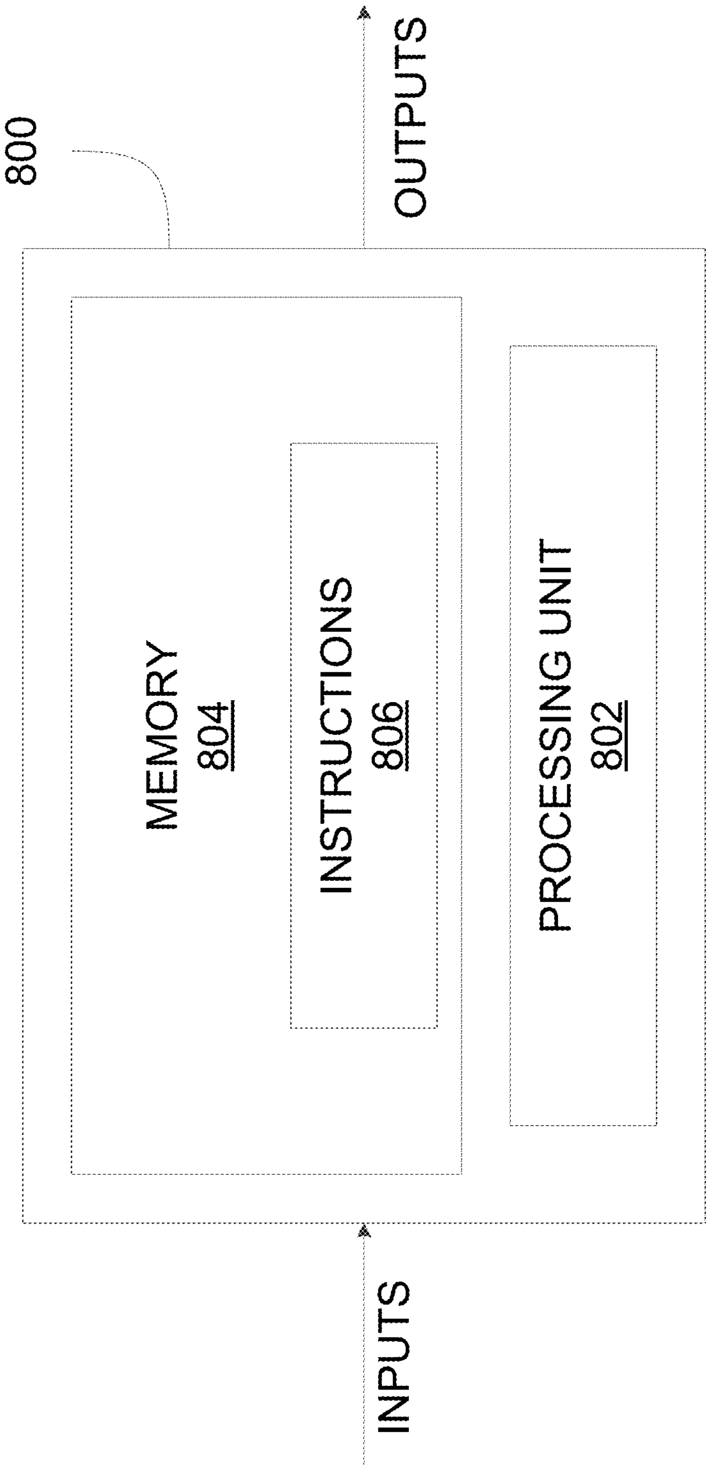
FIG. 8 is a schematic diagram of an example computing device, in accordance with an illustrative embodiment.

FIG. 8 is a schematic diagram of computing device 800, which may be used to implement the methods of FIG. 5A, FIG. 5B, FIG. 5C, and FIG. 5D. In some embodiments, the computing device 800 may also be used as an alternative implementation for the server system 102 and/or the client device(s) 104 illustrated in FIG. 1. In certain embodiments, the computing device 800 is operable to register and authenticate users (using a login, unique identifier, and password for example) prior to providing access to applications, a local network, network resources, other networks, and network security devices. The computing device 800 may serve one user or multiple users.

The computing device 800 comprises a processing unit 802 and a memory 804 which has stored therein computer-executable instructions 806. The processing unit 802 may comprise any suitable devices configured to implement the functionality of the methods described herein such that instructions 806, when executed by the computing device 800 or other programmable apparatus, may cause the functions/acts/steps performed by methods as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitable programmed or programmable logic circuits, custom-designed analog and/or digital circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g. devices) suitable for retrievably storing machine-readable instructions 806 executable by the processing unit 802.

In some embodiments, the systems and methods described herein may allow to reduce the time and complexity associated with the record identification process, in addition to reducing errors and removing bias. In particular, the systems and methods described herein may allow to better take into account the uncertainties in witness statements and the uncertainties in confidence levels associated with event occurrence records data.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

What is claimed is:

1. A record identification method, comprising:

at a computing device having a machine learning model operating therein, obtaining one or more event occurrence records produced by a surveillance system deployed at one or more monitored locations, the plurality of event occurrence records being indicative of at least one event having previously occurred at the one or more monitored locations and detected by the surveillance system, each of the one or more event occurrence records having a first plurality of attributes associated therewith;

executing the machine learning model to determine a probability distribution of the first plurality of attributes, the probability distribution of the first plurality of attributes comprising a first vector of first probabilities, each first probability associated with a respective one of the first plurality of attributes;

receiving one or more witness statements relating to an incident, each of the one or more witness statements having a respective second plurality of attributes descriptive of the incident associated therewith;

comparing the probability distribution of the first plurality of attributes to a probability distribution of the respective second plurality of attributes, the probability distribution of the second plurality of attributes comprising a second vector of second probabilities, each second probability associated with a respective one of the second plurality of attributes;

identifying, based on the comparing, at least one of the one or more event occurrence records for which the probability distribution of the first plurality of attributes matches the probability distribution of the respective second plurality of attributes; and outputting the at least one of the one or more event occurrence records.

2. The record identification method of claim 1, wherein, prior to the executing, the machine learning model is trained by:

receiving a training dataset comprising a plurality of data samples, at least some of the plurality of data samples having a plurality of user-defined classification labels associated therewith, the plurality of user-defined classification labels comprising a set of noisy labels each indicative of a labelling discrepancy associated with at least one labelled data sample;

training the machine learning model using the training dataset and obtaining, at an output of the machine learning model, a predicted probability distribution of the classification labels for the plurality of data samples;

comparing the predicted probability distribution to a plurality of reference classification labels, the plurality of reference classification labels being indicative of a plurality of original classes to which the plurality of data samples belong;

determining, based on the comparing, a proportion of confused ones of the plurality of predicted classification labels that diverge from the plurality reference classification labels; and re-training the machine learning model based on the proportion as determined.

3. The record identification method of claim 1, wherein the one or more witness statements have the respective second plurality of attributes comprising at least one of a time and a location at which the incident occurred.

4. The record identification method of claim 3, wherein the one or more witness statements have the respective second plurality of attributes further comprising at least one of a type of the incident, information about at least one vehicle involved in the incident, a direction of travel of the at least one vehicle, information about at least one person involved in the incident, and information about a physical environment within which the incident occurred.

5. The record identification method of claim 1, wherein receiving the one or more witness statements comprises receiving at least one of at least part of a license plate number, a state associated with the license plate number, a make, a type, a model, a model year, a colour, a condition, and at least one unique characteristic of at least one vehicle involved in the incident.

6. The record identification method of claim 1, wherein receiving the one or more witness statements comprises receiving information about at least one of physical characteristics and a physical appearance of at least one person involved in the incident.

7. The record identification method of claim 1, wherein obtaining the one or more event occurrence records comprises retrieving the one or more event occurrence records from at least one database.

8. The record identification method of claim 1, wherein the one or more event occurrence records are related to surveillance and comprise data acquired by one or more electronic devices deployed at one or more monitored locations encompassing a location at which the incident occurred.

9. The record identification method of claim 1, wherein each of the one or more event occurrence records has associated therewith metadata comprising at least one of an occurrence record type, a time parameter, and a geographical parameter.

10. The record identification method of claim 1, wherein the one or more event occurrence records comprise a plurality of images of vehicles and/or license plates captured by a plurality of cameras deployed at one or more monitored locations, each of the plurality of images having associated therewith metadata comprising at least one of a vehicle license plate number, one or more vehicle characteristics, a time at which the image was captured, a location where the image was captured, and an identifier of a given one of the plurality of cameras that captured the image.

11. The record identification method of claim 1, wherein the one or more event occurrence records comprise video footage captured by one or more video cameras deployed at one or more monitored locations encompassing a location at which the incident occurred.

12. The record identification method of claim 11, wherein the video footage has metadata associated therewith, the metadata indicative of occurrence, at the one or more monitored locations, of the at least one event recorded by the one or more video cameras.

13. The record identification method of claim 1, wherein the one or more event occurrence records comprise a plurality of images of registered persons of interest, each of the plurality of images having associated therewith metadata comprising an identity of a registered person of interest and a location of the registered person of interest.

14. A training method, comprising:

at a computing device, receiving a training dataset comprising a plurality of data samples, at least some of the plurality of data samples having a plurality of user-defined classification labels associated therewith, the plurality of user-defined classification labels comprising a set of noisy labels each indicative of a labelling discrepancy associated with at least one labelled data sample;

training a machine learning model using the training dataset and obtaining, at an output of the machine learning model, a predicted probability distribution of the user-defined classification labels for the plurality of data samples;

comparing the predicted probability distribution to a reference probability distribution associated with a plurality of reference classification labels, the plurality of reference classification labels being indicative of a plurality of original classes to which the plurality of data samples belong;

determining, based on the comparing, a proportion of confused ones of the plurality of user-defined classification labels that diverge from the reference classification labels; and re-training the machine learning model based on the proportion as determined.

15. The training method of claim 14, wherein the plurality of user-defined classification labels further comprises a set of undefined labels each indicative of a labelling uncertainty associated with an outlier one of the plurality of data samples.

16. The training method of claim 14, further comprising determining a classification loss indicative of an error between the plurality of reference classification labels and the plurality of user-defined labels, and adjusting one or more parameters of the machine learning model based on the classification loss.

17. The training method of claim 14, further comprising generating a confusion matrix indicative of the proportion of confused ones of the plurality of user-defined classification labels, the confusion matrix having a plurality of rows representative of the plurality of user-defined classification labels, and a plurality of columns representative of the plurality of reference classification labels.

18. The training method of claim 17, wherein re-training the machine learning model based on the proportion as determined comprises using data from the plurality of rows of the confusion matrix as an input to the machine learning model.

19. The training method of claim 14, wherein comparing the predicted probability distribution to the reference probability distribution comprises computing a cross-entropy loss between the predicted probability distribution and the reference probability distribution.

20. The training method of claim 14, further comprising determining a distance between the predicted probability distribution of the user-defined classification labels and a probability distribution of the confused ones of the plurality of user-defined classification labels, wherein the machine learning model is re-trained until the distance is below a distance threshold.

21. The training method of claim 20, wherein determining the distance comprises determining a Kullback-Leiber (KL) divergence between the predicted probability distribution of the user-defined classification labels and the probability distribution of the confused ones of the plurality of user-defined classification labels.

22. The training method of claim 14, wherein the plurality of user-defined classification labels is indicative of at least one of a make, a type, a model, a model year, a colour, a condition, and at least one unique characteristic of at least one vehicle involved in an incident.

23. The training method of claim 14, wherein the plurality of user-defined classification labels is further indicative of at least one of physical characteristics and a physical appearance of at least one person involved in an incident.

24. The training method of claim 14, wherein the plurality of data samples comprises a plurality of images and/or video footage relating to an incident.

25. The training method of claim 24, wherein the plurality of images is captured by a plurality of cameras deployed at one or more monitored locations encompassing a location of the incident.

26. The training method of claim 24, wherein the video footage is captured by one or more video cameras deployed at one or more monitored locations encompassing a location of the incident.

27. The training method of claim 24, wherein the plurality of images and/or video footage depicts vehicles and/or license plates.

28. The training method of claim 24, wherein the plurality of images and/or video footage depicts at least one registered person of interest.

* * * * *